Figure 1A:
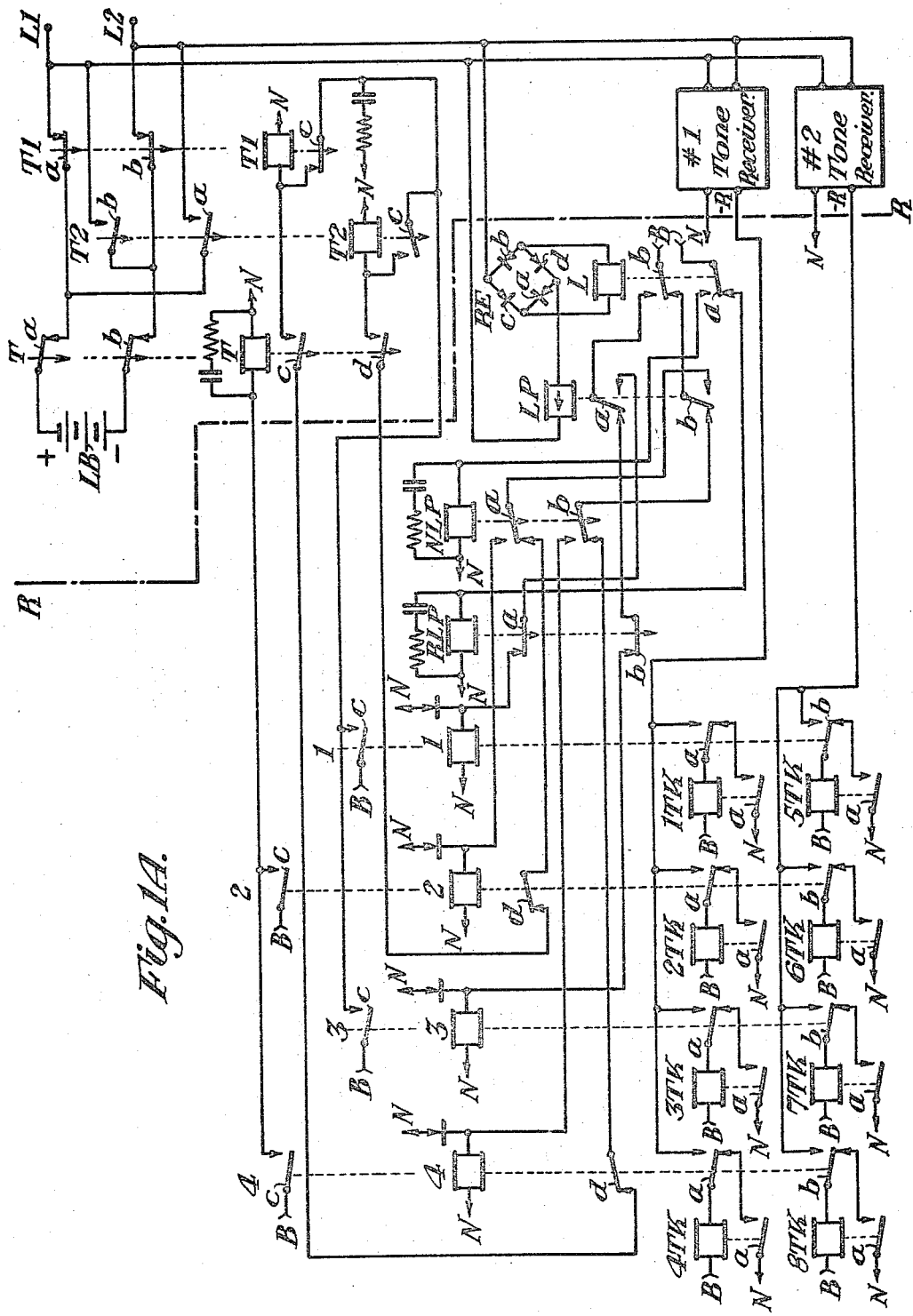

July 30, 1963 A. B. MILLER 3,099,816
REMOTE INDICATION SYSTEMS
Filed May 18, 1960 8 Sheets-Sheet 7

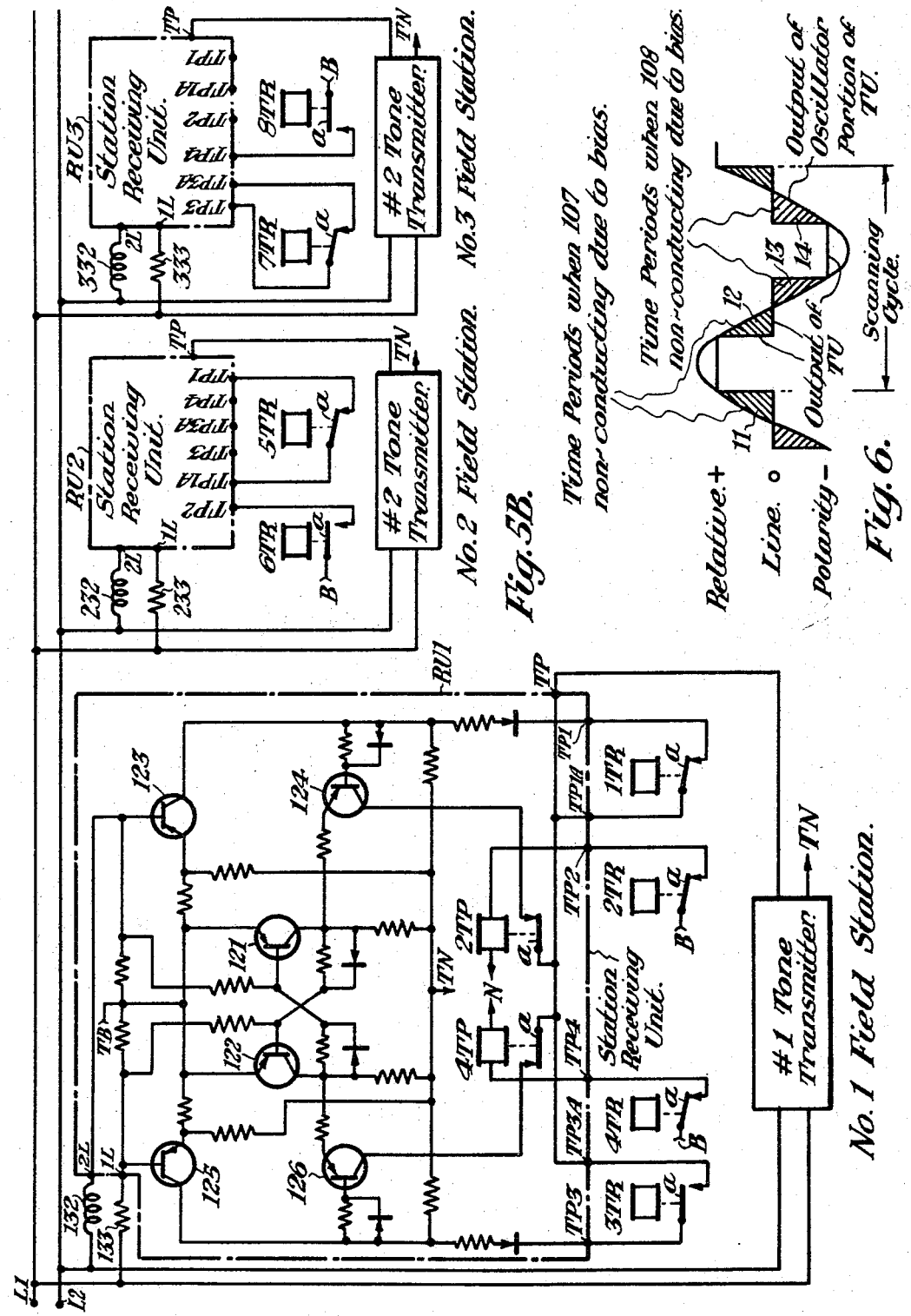

United States Patent Office 3,099,816
Patented July 30, 1963

3,099,816
REMOTE INDICATION SYSTEMS
Alfred B. Miller, Edgewood, Pa., assignor to Westinghouse Air Brake Company, Wilmerding, Pa., a corporation of Pennsylvania
Filed May 18, 1960, Ser. No. 29,906
18 Claims. (Cl. 340—163)

My invention pertains to remote indication systems. More particularly, my invention pertains to systems for indicating at one or more registry locations the position and/or condition of various devices located at a plurality of remote locations.

In many remote control systems, where various types of apparatus located at several spaced stations are controlled remotely by an operator at a single central office point, indications of other field conditions not directly related to the controlled devices are frequently necessary to provide complete information to enable proper operation of the system. For a specific example, in centralized traffic control systems for railroads, indications of the occupancy of each track section throughout a stretch of railroad, particularly in multi-track territory, are quite frequently necessary, in addition to the usual indications of the positions of controlled signals and track switches, to enable the central operator to properly route trains through the stretch to avoid unnecessary delays. In other types of remote control installations, the necessity for similar indications is quite frequently encountered. For various reasons, it is not always possible or efficient to transmit these nonrelated indications over the regular remote control system. The addition of such nonrelated indication functions may unduly lengthen the time for transmissions from some of the field stations. This will delay the transmission of new controls sufficiently in some cases to cause operating delays. Frequently, it is uneconomical to add sufficient length to the regular transmissions or codes due to the requirement for additional station locations or additional apparatus. Also, the reception of such nonrelated indications from these locations, if they are added to the regular system, may be so delayed by the transmission of the necessary controls that the information eventually received is no longer of any value. Said in another way, it is sometimes advantageous to have a separate system in such a remote control installation for these nonrelated indications to improve the speed, economy, and efficiency of the entire installation. Since a condition or position indicated by the nonrelated functions may change frequently, it is also an advantage to have nearly continuous transmission of the indications from the field locations. Of course, in any such remote control or indication installation, economy requires that physical connections between the various locations be kept to a minimum, that is, the use of carrier circuits is almost a necessity to allow multiple use of existing physical line circuits or an existing basic communication channel. Further, the transmission time must be used efficiently, i.e., there should be no unused time intervals during the transmission of the indication functions.

Accordingly, it is an object of my invention to provide a continuously operating remote indication system.

Another object of my invention is a continuously scanning, remote indication system using carrier circuits to eliminate the necessity for additional physical circuits or connections between the various locations of the system.

A further object of the invention is a continuously scanning, remote indication system driven from a single control location but with indication registry at more than one location.

It is also an object of my invention to provide a continuously scanning, remote indication system with a single control location and simultaneous indication transmission from a plurality of locations over separate and distinctive carrier circuits.

A further object of my invention is a continuously scanning remote indication system in which each period of the scanning cycle is used for the transmission of at least one indication function.

Still another object of the invention is a remote indication system of the continuously scanning type using carrier current circuits to provide a plurality of channels and transmitting four or more indications for each carrier tone during each cycle of operation.

Also an object of my invention is a continuously operating remote indication system with the scanning cycles driven from the control location and the indication functions at a plurality of remote stations so grouped that at least one indication function is transmitted during each period of the scanning cycle over each of a plurality of carrier channels.

Still another object of the invention is a remote indication system in which each scanning cycle includes a plurality of indicating periods established by a single control location and in which, during each indicating period, each of a plurality of remote stations may simultaneously transmit an indication of the condition or position of a device located thereat.

Other objects, features, and advantages of my invention will become apparent from the following specification and appended claims when taken in connection with the accompanying drawings.

The general indication system disclosed in this application is of the continuously scanning type, the scanning action being driven from the control and/or registry office location to maintain all remote locations in synchronism. Preferably, this scanning control is accomplished over a two-wire direct current line circuit connecting the control location and all remote stations. A polar direct current code is then transmitted from the control location over this line circuit to all stations to actually drive the scanning action. The office registry and recording apparatus is also driven by this same code to synchronize the reception and recording of the indications. Indications are transmitted from the stations to the office over the same two-wire line circuit by use of carrier current pulses or tones, each group of indications being assigned a specific carrier frequency different from that assigned each other group. However, it is to be understood that the scanning action may also be controlled over some arrangement of carrier current circuits such as, for example, one or more frequency shift carrier circuits arranged to provide operation equivalent to that of the polarized direct current circuit. The indication carrier circuits can then be superimposed on the same carrier communication channel that carries the scanning control. However, only species using direct current code pulses to control the scanning action will be described in this specification since the modifications necessary to adapt the illustrated code transmitting units to control code transmission over such carrier circuits will be obvious to those skilled in the art and add no novelty to my present invention.

Within this general type of operation, three forms of the invention are illustrated by specific examples. The first two all-relay forms differ principally in the number of indications transmitted over each carrier circuit during the scanning cycle. The third form illustrates a transistorized version of the first all-relay form, and assigns the same number of indications to each carrier frequency tone.

In the first relay form, one carrier frequency tone is required for each group of four wayside devices to be indicated while in the second form, eight wayside devices are indicated over each carrier circuit used. In each of the relay forms, a relay arrangement is used at the office or transmitting location to produce a scanning cycle which comprises four approximately equal length periods over the line circuit. During the first period of this cycle, the two-wire line circuit is energized with direct current energy of one relative polarity. During the second period, the line circuit is deenergized while during the third period the line circuit is energized with direct current having the opposite relative polarity. During the final or fourth period, the line circuit is again deenergized. This scanning cycle repeats continuously. The transmitting relays at the control location are driven by the associated registry unit to advance the scanning cycle, that is, the periods thereof, as this registry unit responds to the code pulses. In other words, there is no advance in the scanning cycle from period to period except as the associated registry unit properly responds to condition itself for recording the indications transmitted from the field stations. The transmitting relay arrangement is different in each of the two forms although the principle of operation and the scanning cycle itself are similar.

In the first form used as a specific example, that is, with four indications per tone, at each field location and at each registry location, one of the latter of which is also the transmitting location, relays are used to detect each of the separate and distinct periods of the scanning cycle. At each location, the detection arrangement consists simply of two line relays, one of which is a polar type relay. Between these two relays, four conditions or positions are provided in the receiving apparatus. Each condition is associated with one of the indications to be transmitted or received. At each field station, the associated carrier tone transmitter or generator is controlled in accordance with the wayside conditions during each condition of the line receiving relays. Actually, a single relay is used to repeat, during each line condition, the position of the associated wayside indicator. This repeater relay activates or does not activate the associated tone transmitter in accordance with the two-position indication to be transmitted. Each registry unit has a similar set of line receiving relays, one neutral and one polar. In addition, each registry unit is provided with two repeaters for the neutral line relay and with four counting relays. The two line relays with the corresponding repeaters establish distinctive conditions during the counting or scanning cycle to operate the counting relays to count the cycle periods. Each counting relay establishes circuits for indication stick relays corresponding to those indications at the remote locations which are assigned to that period of the scanning cycle. Further control of the indication stick relays is exercised through a carrier tone receiver, one for each frequency, which, over the circuits established by the counting relays, energizes these stick relays or withholds energy therefrom in accordance with the indication received. As was described previously, the line relays, their repeaters, and the counting relays together, as they advance through their various conditions during the scanning cycle, drive the transmitting relays to advance the cycle.

In the second specific form illustrated, that is, the eight indication form, each receiver unit, whether it be at a station or registry location, divides each of the four line condition periods during each scanning cycle into two subperiods for indicating and recording purposes. Each receiving unit consists of two line relays, one of which is a polar type relay. At the stations, in accordance with the number of indications locally assigned, repeater relays of the neutral line relay are provided to respond to the line condition circuit to establish the eight indication periods. In other words, at each station where a complete set of the relays is provided, the line relays and their repeaters establish, during each scanning cycle, eight transmitting or indicating conditions. During each such condition, a different one of the wayside indicators is connected to energize the station carrier tone transmitter to transmit the corresponding carrier frequency tone. This control of the carrier tone transmitter may be similar to that used in the four indication form but as shown varies slightly to illustrate a different method of control. Each registry unit includes similar line relays and two sets of cascaded repeater relays of the neutral line relay to establish the eight conditions for reciving the various indications. Again, there are two receiving or recording conditions established for each condition of the line circuit. Eight counting relays are driven during the scanning cycle by the line relays and their repeaters, one counting relay corresponding to each receiving condition. The counting relays complete the circuits to the indication stick relays at the proper time to receive, through tone receivers, the indications transmitted from the stations as carrier frequency tones. The final repeater relay of each cascaded repeater relay series and the counting relays together drive the transmitting relays to advance the scanning cycle at the proper times, providing that the registry unit has properly responded.

In the third form of my invention, transistors are used to replace certain relays or relay combinations in the all-relay forms. As actually shown, these transistors replace relays of the first form of my invention and provide a similar operation, that is, four indications may be transmitted for each carrier frequency tone. The transmitting relay unit at the control office is replaced by a pulse generating network comprising a transistorized oscillator and a transistorized balanced squaring circuit arrangement. This pulse generator is energized directly from the line battery and supplies the code pulses from this line battery to the line circuit. The oscillator is used to provide a very low frequency output preferably having a sine wave form. This sine wave output from the oscillator is then modified by the balanced squaring network into a code pulse output which is identical with that used in the other forms illustrated. In other words, the pulses over the line circuit have an alternately opposite relative polarity with each energized period being followed immediately by a deenergized period on the line circuit. It is to be noted that the oscillator and squaring network operate independent of any registry unit and thus may be located, if desired, at a location separate from any of the registry locations. At the stations, the receiving line relays of the other forms are replaced by a transistor switching network which includes a bistable multivibrator arrangement to remember the polarity of the applied input voltages of the code pulses. This transistor network is responsive to the various line conditions during a scanning cycle to establish four conditions at a station for the transmission of four indications. The transistor network connects the wayside indicators to control the associated tone transmitter, one indicator during each of the corresponding conditions established by the network. At a registry location, a similar transistor switching network is used to replace the line receiving relays and their repeaters of the first form. Again, this transistor network is responsive to the line conditions established by the transmitting unit to establish four conditions for recording the indications transmitted from the various stations. This arrangement still uses the counting relays to count the periods of the scanning cycle, four power transistors being interposed between the switching network and the relays to provide input signals of short duration to energize one relay during at least a portion of each line period. The counting relays are then used to establish the indication recording circuits in a manner similar to that in the first form. Energy is supplied over these indicating and recording circuits from the tone receivers, in accordance with the indications received from the field, to the indication stick relays to record the received indications. This transistor and relay arrangement at the registry location thus establishes a correspondence between the condition of the remote field switching networks and the registry switching network to properly record these indications.

Figure 1B:
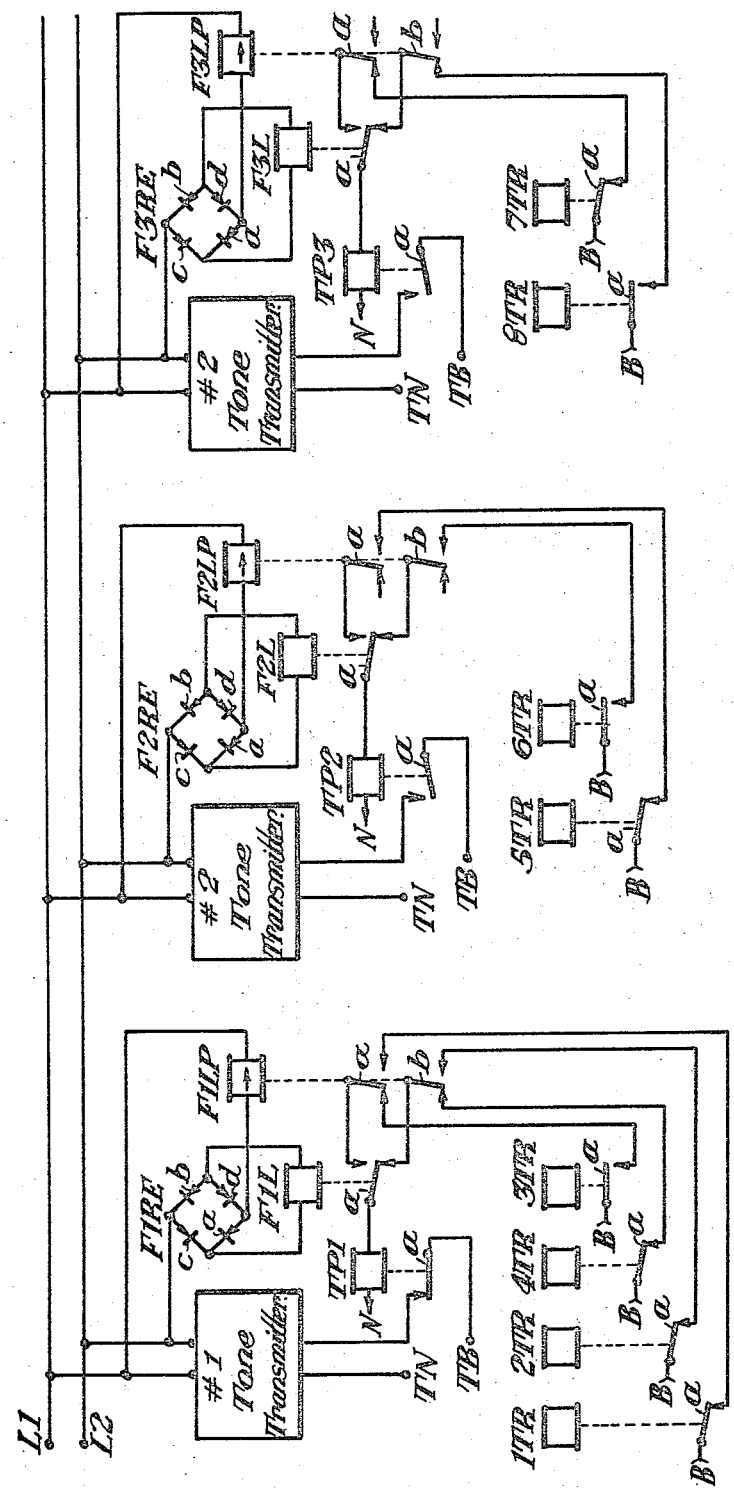

Referring now to the drawings, FIGS. 1A and 1B, when taken together with FIG. 1A preferably on the left, show in diagrammatic manner a remote indication system embodying the first form of my invention.

Figure 2A:
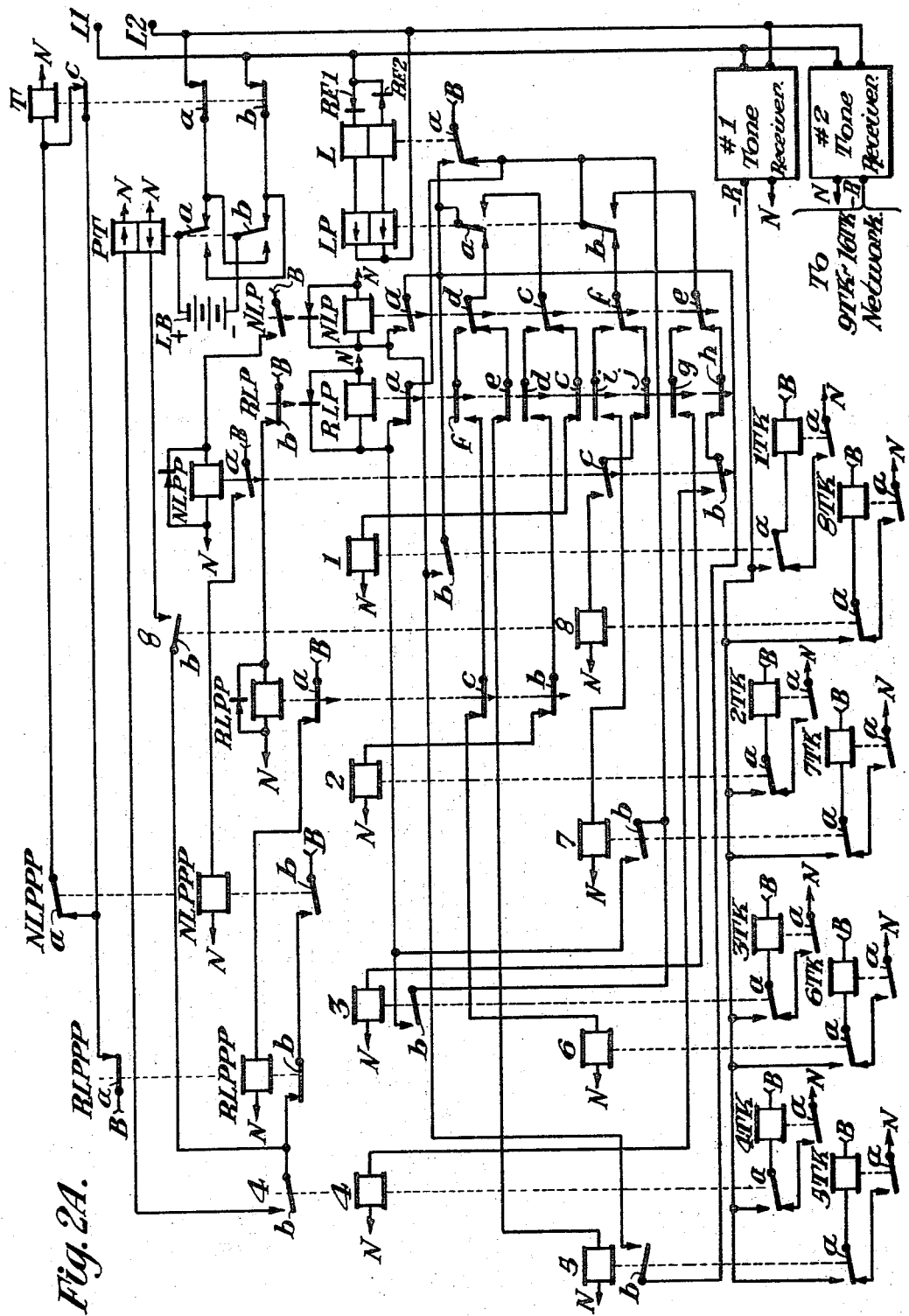
Figure 2B:
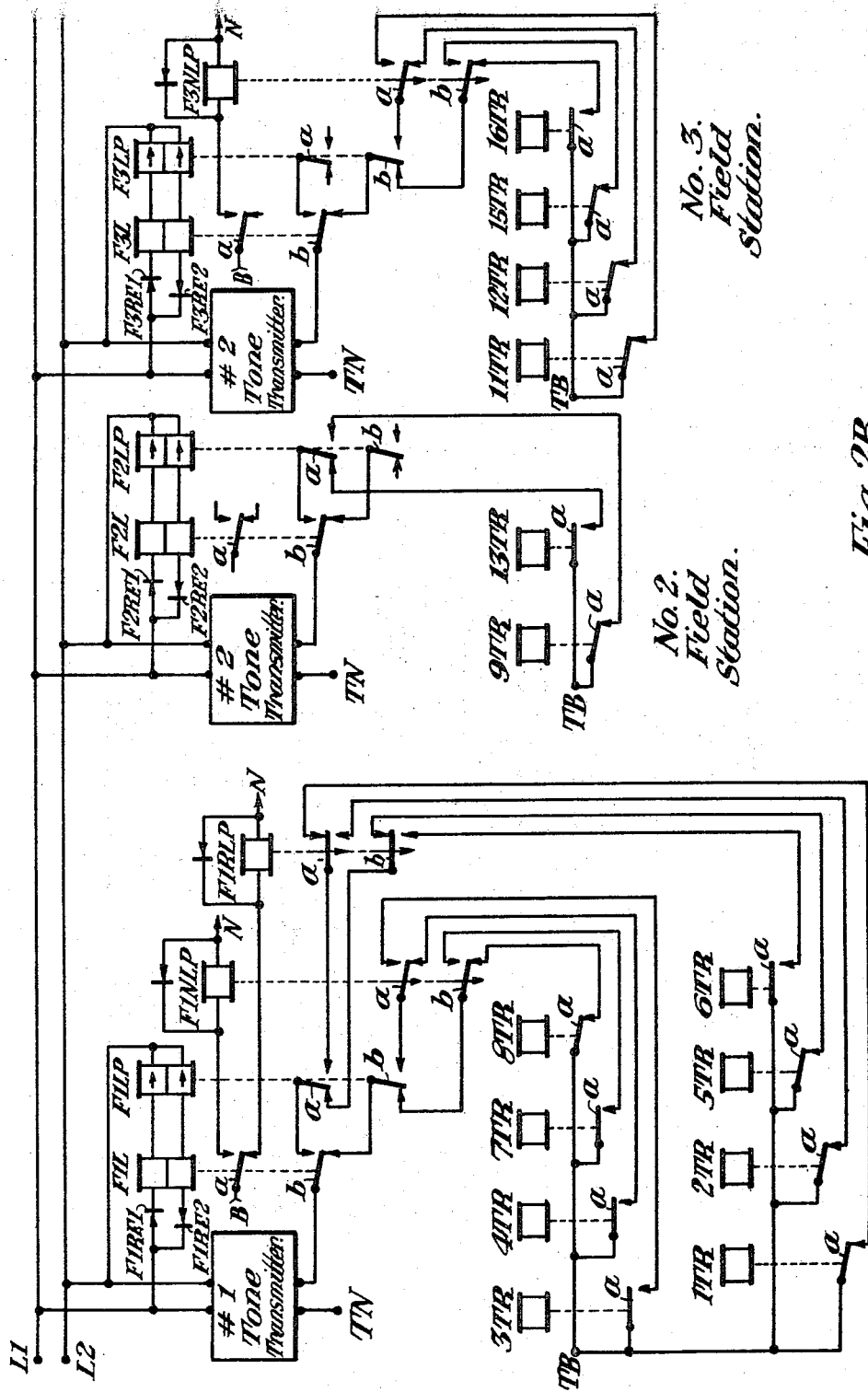

FIGS. 2A and 2B, when taken together with FIG. 2A to the left, illustrate diagrammatically a remote indication system embodying the second form of my invention.

Figure 3:
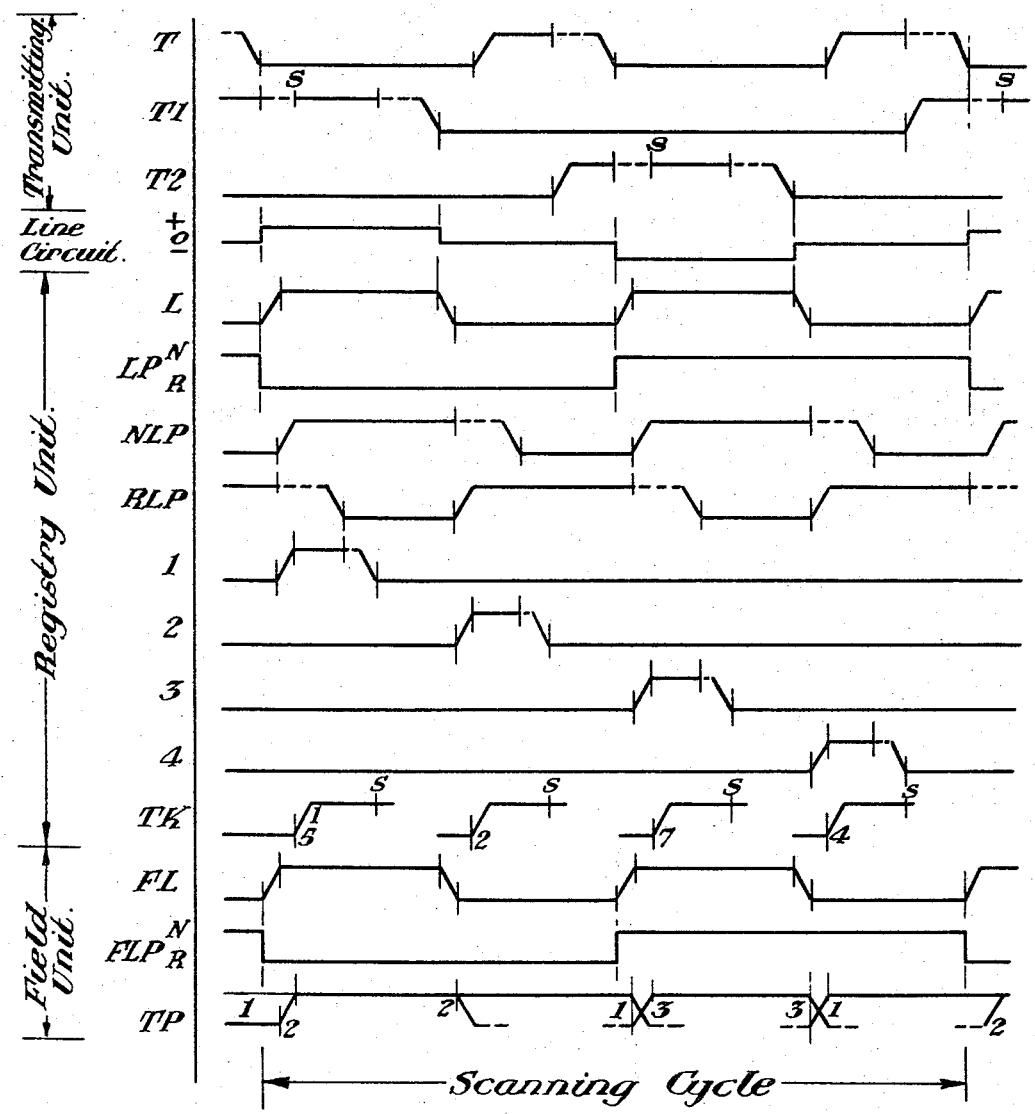

A relay timing chart illustrating a complete scanning cycle for the system of FIGS. 1A and 1B is presented in FIG. 3.

Figure 4:
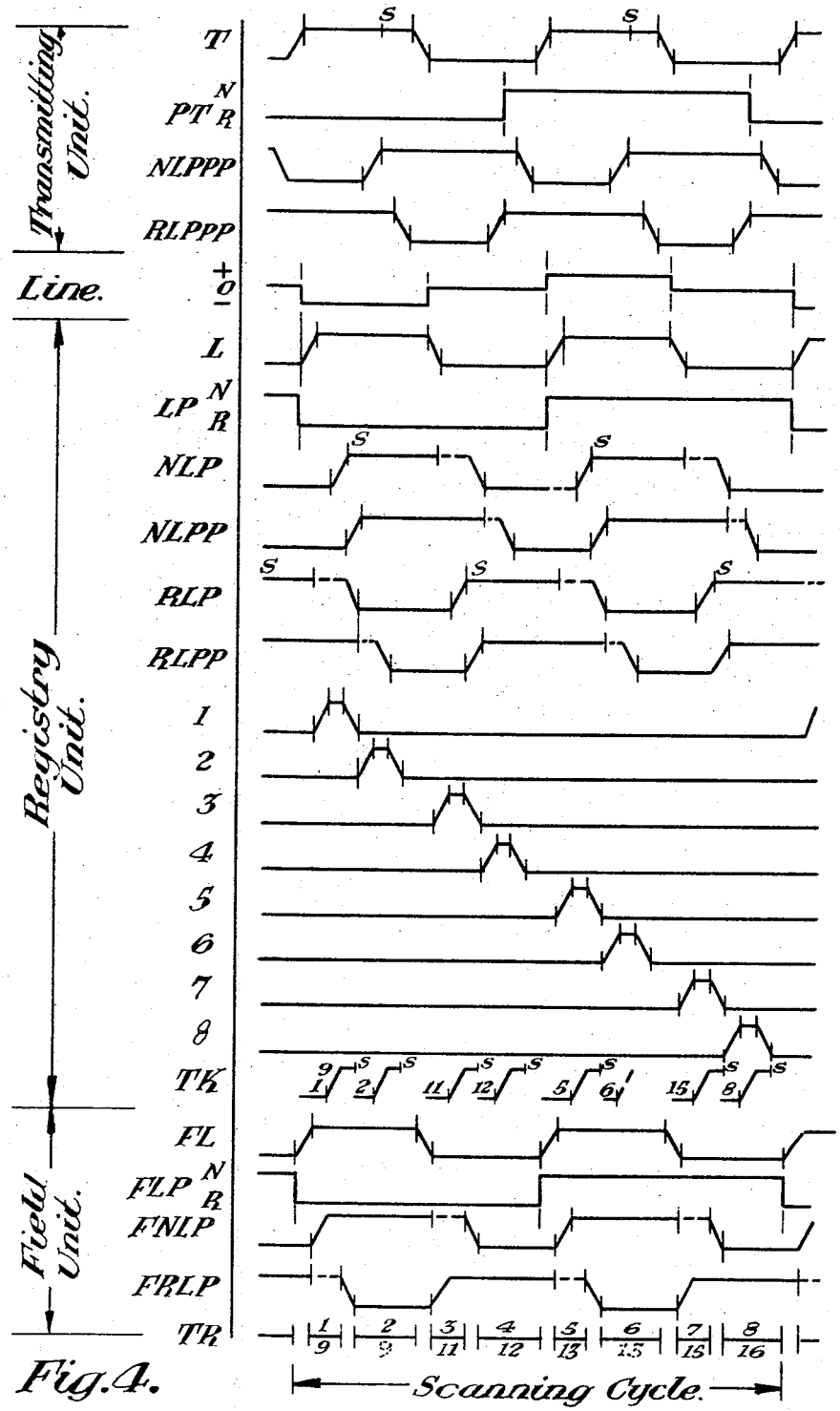

A similar relay timing chart for the second form of FIGS. 2A and 2B is illustrated in FIG. 4.

Figure 5A:
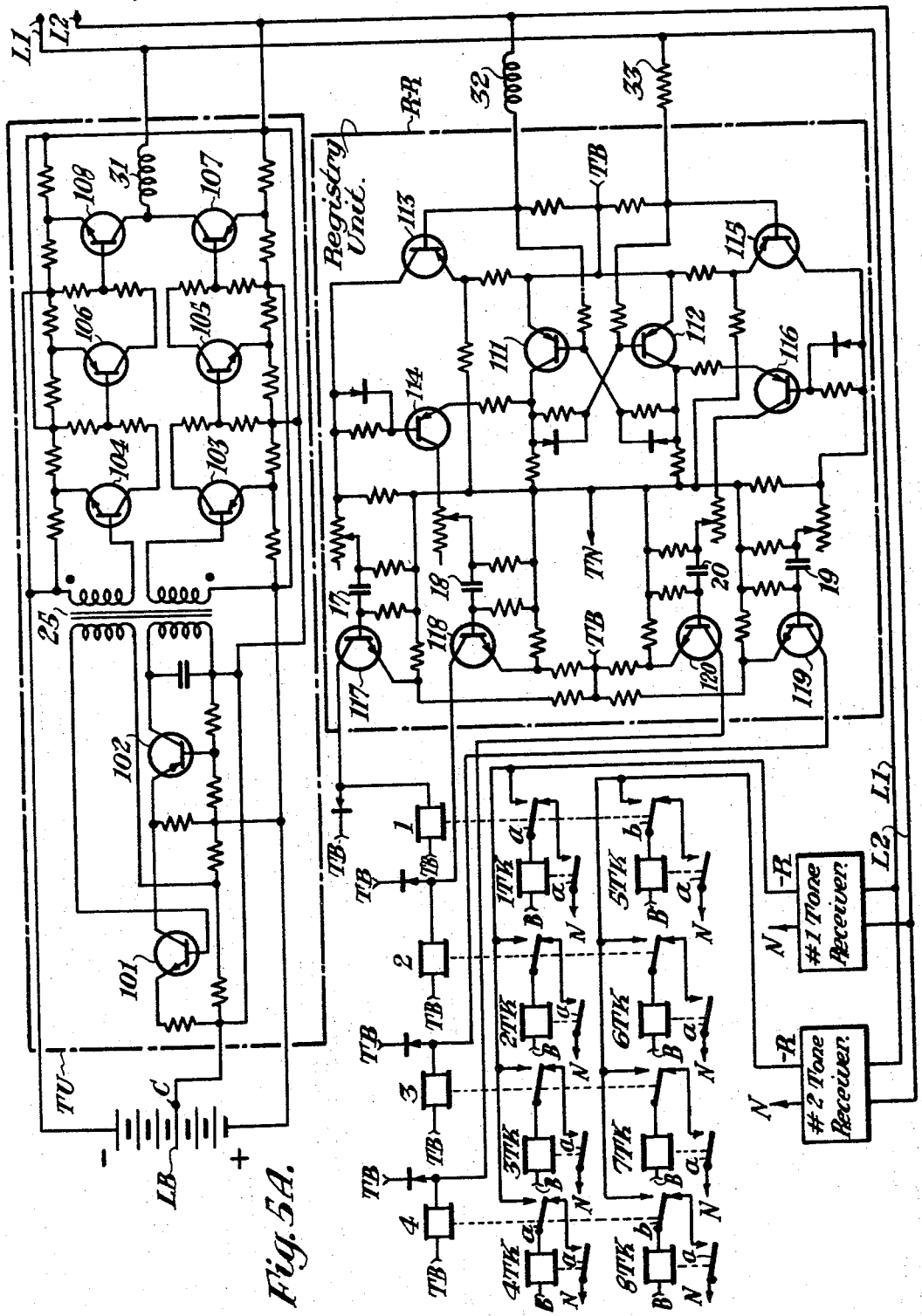

FIGS. 5A and 5B when taken together, preferably with FIG. 5A to the left, illustrate in diagrammatic form a transistorized indication system which comprises the third form of my invention.

FIG. 6 is a schemtic diagram illustrating the operation of the code transmitting unit of the transistorized form of my invention shown in FIG. 5A.

In each of the figures of the drawings, similar reference characters designate similar parts of the apparatus. Further throughout the drawings, where similar apparatus is located at both the control office and the various stations, the prefix F, generally followed by a numeral corresponding to the station number, has been used to distinguish the station apparatus. In connection with the circuits illustrated, each separate location, office and stations, is provided with its own local source of low voltage direct current for operation of the various relays not otherwise supplied. Similarly, a local source of sufficient voltage is also provided to supply the energy required by the carrier circuit apparatus and the transistor circuit networks. Each of these sources may be of any well known type such as a battery, a rectifier, or some other available supply having sufficient capacity and proper voltage. A common source with taps to provide desired voltage levels may be used. All such types of sources are well known and the actual sources used are therefore not shown in detail in order to simplify the drawings. However, the positive and negative terminals of the low voltage source at each location are indicated by the conventional reference characters B and N, respectively, while the similar terminals of the source used with carrier apparatus and transistors are designated TB and TN.

Each unit of carrier tone apparatus in the illustrated forms is shown by conventional block diagram since such items of equipment are well known and any type presently available may be adapted for use in this system. Throughout the explanation, it is considered that the carrier tone transmitters generate and transmit current of a corresponding tone frequency when power is supplied to the unit. Correspondingly, each carrier receiver unit is considered to complete an internal connection between its terminal —R, indicated on the conventional block, and its connection to terminal N of the local low voltage direct current source, when carrier current of the corresponding frequency is received. It is believed that the supply of suitable power for the energization of such carrier apparatus is sufficiently well known in the art that, except where necessary to discuss the power supply connections to the carrier apparatus in explaining the details of system operation, such connections are omitted from the drawings.

In order to designate in the drawings those relays which are provided with, or inherently have, slow release characteristics, each contact of such relays is so designated by a well known conventional symbol, a downward-pointing arrow drawn through the movable portion of the contact. Certain relays used in the arrangements are of the magnetic stick type, such as line relay LP in FIG. 1A. Such relays are so designated by an arrow shown within the symbol for the relay winding and the vertical positioning of the movable parts of the relay contacts. Magnetic stick type relays operate their contacts to close in their left hand or normal position when the flow of current through the relay winding is in the direction of the arrow, while flow of current in the opposite direction causes the relay to close its contacts in the right hand or reverse position. When the relay winding is deenergized, the contacts remain in the position to which they were last operated. Other symbols used throughout the drawings are conventional and need no further explanation for an understanding thereof.

I shall now describe the details and operation of the three forms of my invention, with reference to the accompanying drawings, and shall then point out the novel features thereof in the appended claims. Certain novel features of the detailed transistor networks are not part of my invention and will not be claimed herein. These features are claimed in copending application Serial No. 34,794, filed June 8, 1960, by R. F. Sparrow and P. H. Luft, for Switching Circuits, and copending application Serial No. 107,540, filed May 3, 1961, by P. H. Luft and R. F. Sparrow, for a Code Pulse Generator, which applications have the same assignee as this application.

Referring now to FIGS. 1A and 1B, shown therein is the circuit arrangement, at the control office location (FIG. 1A) and three field station locations (FIG. 1B), for a system embodying the first form of my invention. These locations are connected by a communication channel illustrated as being a two-wire line circuit, the wires being designated by the reference characters L1 and L2 shown at the terminals in the upper right and upper left of the two figures, respectively. It is to be understood, of course, that other stations may be connected to the same circuit and that such is probable in most installations, with the addition of the necessary carrier circuits to handle the indications from the additional field stations. The system illustrated is of the continuously operating type, repeating its scanning cycle in immediate succession. In other words, there is no normal at-rest condition in this system, the succeeding scanning cycle beginning immediately upon the completion of each cycle. Thus the positions of the relays in these two figures of the drawings are shown as they exist at a particular selected time instant in the scanning cycle. This time position has been chosen to be that when the line circuit has just assumed its relative positive condition. In other words, the apparatus is shown in the position which it occupies when the transmitting relay T in FIG. 1A has just released to close its line circuit contacts *a* and *b* and thus reenergize line wires L1 and L2. In FIG. 1A, in the upper right portion, this circuit may be traced from the positive terminal of line battery LB over back contact *a* of transmitting relay T and front contact *a* of auxiliary transmitting relay T1 to line terminal L1, returning from the other line terminal L2 over front contact *b* of relay T1 and back contact *b* of relay T to the negative terminal of battery LB. Throughout this description, the condition of the line circuit with positive terminal of battery LB connected to line wire L1 is designated the relative positive condition of polarity of the line circuit. In its other energized condition, the relative negative polarity condition, the positive terminal of battery LB is connected to line wire L2 over back contact *a* of relay T and front contact *a* of another auxiliary transmitter relay T2. The corresponding connection from line wire L1 to the negative terminal of battery LB includes front contact *b* of relay T2 and back contact *b* of relay T. It is obvious that if back contacts of relay T are open, or if both relays T1 and T2 are released so that their front contacts are all open, the line circuit is deenergized.

In FIG. 1A, the portion of the apparatus below and to the left of the dot-dash line R—R is that included in what is here termed the registry unit. This unit includes the line or receiving relays L and LP which are, respectively, neutral and polar relays. Relay L detects whether or not the line circuit is energized while relay LP, a magnetic stick type relay, detects the polarity of the energization. The line connections of the registry unit are connected across the line wires, i.e., terminals L1, L2, in multiple with the similar connections at the field stations, as shown in FIG. 1B. Obviously, they are also in multiple with the transmitting unit connections including line battery LB. The line connections of the registry unit include the rectifier assembly RE which consists of four half-wave rectifier units connected in the well known full-wave arrangement. When the line circuit is energized so that line L1 has the relative positive polarity, the flow of current through the line connections of the registry unit may be traced from terminal L1 through the winding of relay LP in the direction opposite to the arrow, rectifier unit $a$ of assembly RE, the winding of relay L, and rectifier unit $b$ of assembly RE to terminal L2 of the line circuit. It is obvious that, under these conditions, relay L is energized so that it picks up while relay LP is energized in the direction to operate its contacts to close in reverse positions. With the line circuit polarity in the opposite condition, the current flow may be traced from terminal L2 through unit $c$ of assembly RE, the winding of relay L, unit $d$ of rectifier assembly RE, and the winding of relay LP in the direction of the arrow to terminal L1 of the line circuit. Under these conditions, relay L is again energized so that it picks up while relay LP is energized with current in the direction to close its contacts in their normal positions. When the connections to line battery LB are interrupted so that the line circuit is deenergized, relay L is also deenergized and releases its contacts. Relay LP, however, under these conditions holds its contacts in the position to which they were last operated.

The registry unit is provided with a front and back contact repeater of relay L, these repeater relays being designated NLP and RLP for front and back contacts, respectively. They repeat the line circuit energized and deenergized and are energized by simple circuits over front and back contacts $a$, respectively, of relay L. Each repeater relay is provided with slow release characteristics amplified by the resistor-capacitor snub connected in multiple with the relay winding. Under these conditions, each relay holds its front contacts closed for a selected time interval after the relay winding is deenergized, the required time period being more fully described later in connection with the operational description of the apparatus.

Four counting relays 1, 2, 3, and 4 are included in the registry unit, one for each period of the scanning cycle in this embodiment of the invention. The energizing circuit for relay 1 is traced from terminal B of the local source over front contact $b$ of relay L, reverse contact $a$ of relay LP, front contact $a$ of relay RLP, and the winding of relay 1 to terminal N of the local source. As will be seen later in the description, relay 1 is energized shortly after the beginning of the scanning cycle and becomes deenergized when relay RLP releases. Each counting relay is provided with a half-wave rectifier snub connected in multiple with its winding. However, the release time of the relays when deenergized is not sufficiently extended by this snub to classify these relays as slow release although there is a short period of delay. The circuit for relay 2 includes back contact $b$ of relay L, reverse contact $b$ of relay LP, and front contact $a$ of relay NLP. It is obvious that this relay is energized during a line deenergized period when relay L is released. The circuit for relay 3 includes front contact $b$ of relay L, normal contact $a$ of relay LP, and front contact $b$ of relay RLP, while the similar circuit for relay 4 includes back contact $b$ of relay L, normal contact $b$ of relay LP, and front contact $b$ of relay NLP. From these circuits, it is clear that relays 1 and 3 are energized during line energized periods while the even numbered counting relays are energized during deenergized periods of the line circuit. The operation of these relays will be more clearly explained when the complete cycle of operation is described hereinafter.

The registry unit also controls the indication stick relays TK. In actual practice, these stick relays may not be inside the registry unit, only the control circuits including contacts of the counting relays being contained within the unit. In this manner, a particular TK relay may or may not be supplied in accordance with the existence of a corresponding indication assigned to the associated carrier tone during that particular period of the cycle. In any event, each counting relay controls one indication relay for each carrier tone used in the entire installation. The carrier tone receivers are shown in block form in the lower right of FIG. 1A, to the right of line R—R, with line terminals of each receiver connected across line wires L1 and L2 to receive carrier current of the associated frequency from the stations. The conventional showing is used since any one of the various types of carrier receivers available in the art may be used, the only requirement being that the receivers be compatible with the tone transmitters used at the stations. It is to be understood that when a particular tone receiver herein is activated by the reception of carrier current of the assigned frequency from the stations, internal connections are completed between its output terminal —R and the external connection to terminal N of the local source. With this understanding, the circuit for any one of the TK relays is quite simple, being traced, for example, for relay 1TK from terminal B through the winding of this relay over front contact $a$ of relay 1 to terminal —R of the number 1 tone receiver and thence through the internal circuitry of the receiver to terminal N. It is obvious that relay 1TK can only be energized through the tone receiver when the corresponding counting relay 1 is picked up so that its front contact $a$ is closed. If an indication relay is energized, it is held energized by its own stick circuit when the counting relay releases. The stick circuit for relay 1TK, for example, is traced from terminal B through the relay winding, back contact $a$ of relay 1, and front contact $a$ of relay 1TK to terminal N. Similar energizing and stick circuits are shown for each of the indication relays illustrated. It is also obvious and well known that these indication relays can control any kind of a visual indicator which may be desired in connection with the installation. In the specific example, the reference character TK is chosen as illustrating the indication of track occupancy of track sections at remote locations in a centralized traffic control system for a railroad.

It is to be noted at this time that indications may be registered at more than one location in a single system if desired. It is only necessary that an additional registry unit, necessary tone receivers, and the necessary indication relays TK be provided at the other locations and connected across the line circuit. It is believed unnecessary to illustrate such a location since the registry unit circuitry including the line circuit connections through the tone receivers is identical with that shown in FIG. 1A. The only omission is the connections from the registry unit to the transmitting relay arrangement in the upper right portion of FIG. 1A. This arrangement, of course, is not required at the additional registry locations and in fact would be inappropriate since the system can only be controlled by a single transmitting relay unit. The transmitting unit, wherever located, must be associated in this form with a registry unit as will become apparent during the operational description.

The transmitting relay arrangement shown in the upper right of FIG. 1A is controlled by the registry unit. In this manner, the scanning cycle is advanced from period to period only as the registry unit and the field station receiving arrangements follow the coding action. For example, relay T has an energizing circuit which includes, in multiple, front contacts $c$ of counting relays 2 and 4. This relay is further supplied with a resistor-capacitor snub connected in multiple with the relay winding in order to provide slow release characteristics for this relay, as is indicated conventionally by the arrows drawn through the relay contacts. Associated with transmitter relay T are two auxiliary transmitter relays T1 and T2. The first of these has an energizing circuit traced from terminal B over back contact *b* of relay L, normal contact *b* of relay LP, back contact *b* of relay NLP, back contact *d* of relay 4, front contact *c* of relay T, and the winding of relay T1 to terminal N. Relay T2 has a similar energizing circuit which includes back contact *b* of relay L, reverse contact *b* of relay LP, back contact *a* of relay NLP, back contact *d* of relay 2, and front contact *d* of relay T. These two auxiliary relays have a common stick circuit including front contacts *c*, in multiple, of relays 1 and 3 and connected to each relay winding over its own front contact *c*. In addition, a capacitor-resistor snub is connected in multiple with the relay winding, when its stick circuit is complete, over this same front contact *c*. Each of these relays is thus provided with a slow release characteristic. The complete operation of the transmitting relay unit arrangement will be described in detail later in the specification.

Each station location shown in FIG. 1B is provided with line relays FL and FLP and a rectifier assembly FRE connected in an arrangement identical with that shown in the registry unit. These elements are distinguished from each other and from the registry unit elements by a prefix, comprising the letter F and a numeral corresponding to the station number, added to the basic reference character. These units are connected across the line circuit in multiple, the line circuit being represented by terminals L1 and L2 in the upper left which are identical with the similar terminals in FIG. 1A. The operation of this receiving arrangement at each station is similar to that at the office registry unit. In other words, when line L1 has the relative positive polarity, relay FL is energized and picked up and relay FLP operates to its reverse position. When the opposite line polarity exists, with line L2 positive, relay FL is again picked up and relay FLP occupies its normal position. Finally, when the line circuit is deenergized, relay FL releases while relay FLP holds in its last position.

Each station is also provided with an indicator repeater relay, here designated by the basic reference TP plus a numerical suffix identical with the station number. Each station is also provided with a selected number of two-position indicators which close a contact in a selected one of these two positions. These indicators are herein shown, for convenience, as a relay and, as a specific example of a railroad track indication system, are given the reference character TR corresponding with that normally used for track relays. The control circuits for these relay indicators are not shown since they form no part of my invention. For convenience, it is assumed that each relay is released when the corresponding track section is occupied and is otherwise picked up. Thus, when the track section is occupied, the relay is released to close its back contact and provide a positive indication through the system to the registry unit. Each station has up to four indicators assigned depending upon the wayside conditions at that location. The station TP relay is controlled by the associated TR relays, one on each period of the scanning cycle, if four indications are located at that station. Use of the relay TP is desirable to eliminate the necessity of carrying the relative high voltage supply for the carrier units over the wayside circuits. At field station 1, a typical circuit for relay TP1, for example, is traced from terminal B over back contact *a* of relay 1TR, reverse contact *a* of relay F1LP, front contact *a* of relay F1L, and the winding of relay TP1 to terminal N. The similar circuits which exist during other periods of the scanning cycle include, respectively, the back contacts of the other indicator relays, normal and reverse contacts *a* and *b* of relay F1LP, and front and back contacts *a* of relay F1L. These circuits are obvious and need not be traced in detail. At stations 2 and 3, the corresponding relay TP is controlled only during two periods of the scanning cycle. At station 2, this control by indicator relays 5TR and 6TR is over reverse contacts only of relay F2LP. At station 3, similar control circuits include only the normal contacts of relay F3LP.

Each station is provided with a carrier current tone transmitter, there being one such carrier tone transmitter for each four indications at the various field stations. As previously mentioned, these transmitters transmit over the line circuit a carrier frequency current of the assigned frequency only when the transmitter is energized. As is obvious, this occurs only when the associated relay TP is picked up to close its front contact *a*, at which time the connection is completed from the power source terminal TB to one power terminal of the tone transmitter, the other power terminal being permanently connected to the other terminal TN of the source. Obviously, the assigned frequency of each transmitter must correspond to the frequency to which the corresponding tone receiver at the office is tuned. At station 1, the No. 1 tone transmitter which is used to transmit the four local indications from relays 1TR to 4TR, inclusive, has the same frequency assignment as the No. 1 tone receiver at the office. At station 2, the No. 2 tone transmitter is used to transmit only two indications, from relays 5TR and 6TR, to the office. A similar tone transmitter is provided at station 3 to transmit indications from relays 7TR and 8TR which complete the group of four indications assigned to the No. 2 tone. These last tone transmitters obviously correspond in frequency to the No. 2 tone receiver at the office. Although not specifically shown, it is obvious that only one indication, or three indications, may also be transmitted from a station with proper circuit arrangements. Thus, any group of four indications may be divided between one to four stations in the system providing that a tone transmitter having the same frequency is also provided at each of these same stations where the indications are located.

Without proceeding with an operational description of the first form of my invention, I shall now describe the circuit details of the system embodying the second form of my invention, FIGS. 2A and 2B, wherein eight indications may be transmitted for each tone frequency assigned. This second form may be used where a large number of indications exist at common locations. It does require more relays at each location than the first form. However, by enabling eight indications to be sent per tone, this second form requires less station arrangements and office receivers than if the first form is used where indications are physically grouped in large numbers. The system timing of this second form is somewhat more critical than in the first form, particularly if a group of indications is divided between two or more locations. For this reason, it may be said that this form is less preferable for normal use than is the first form but that specific installations may occur where it will satisfactorily meet the requirements in a more economical manner.

The communication channel is again illustrated as being a two-wire line circuit controlled by a transmitting unit at the office comprising two transmitting relays shown in the upper right of FIG. 2A. Transmitting relay T is used to open and close the line circuit connections to energize and deenergize the line circuit while polar transmitting relay PT determines the polarity of the line voltage applied. The actual circuits may be traced for the relative negative polarity condition from the positive terminal of line battery LB over reverse contact *a* of relay PT and front contact *a* of relay T to terminal L2 of the line circuit, returning from terminal L1 over front contact *b* of relay T and reverse contact *b* of relay PT to the negative terminal of the line battery. Positive polarity conditions exist when relay PT occupies its normal condition so that the circuit is traced from the positive terminal of battery LB over normal contact *a* of relay PT and front contact *b* of relay T to terminal L1, returning from terminal L2 over front contact *a* of relay T and normal contact *b* of relay PT to the negative terminal of battery LB. Since, as in the first form, this is a continuously operating system, the transmitting relays are shown positioned at the instant that relay T recloses the line circuit with negative polarity, that is, with relay PT in its reverse position. The remaining relays in this form are shown in the position which they occupy at this moment just prior to any action resulting from the reenergization of the line circuit.

The control office is provided with two line receiving relays each of which is of the two winding type. Further, line relay L is a neutral relay while relay LP is a magnetic stick relay. The connections to the line circuit include two half-wave rectifiers poled such that, when positive polarity exists on the line circuit, the flow of current may be traced from terminal L1 through rectifier unit RE1 and the upper winding of relays L and LP to terminal L2. When line wire L2 is of positive polarity, the flow of current is reversed, flowing from terminal L2 through the lower windings of relays LP and L and rectifier unit RE2 to terminal L1. It is obvious that, as in the first form, relay L detects the energized or deenergized condition of the line circuit while relay LP detects the polarity of the energization of the line circuit.

Relay L is provided with a front and a back contact repeater, the repeater relays NLP and RLP. However, the energizing circuits differ somewhat from those shown in the first form, here including contacts of certain of the counting relays. Each repeater is further provided with a stick circuit. For example, the energizing circuit for relay NLP is traced from terminal B over front contact *a* of relay L, front contacts *b*, in multiple, of counting relays 1 and 5, and the winding of relay NLP to terminal N. When relay NLP picks up, it completes a stick circuit at its own front contact *a* which further includes front contact *a* of relay L. A similar energizing circuit for relay RLP includes back contact *a* of relay L and front contacts *b*, in multiple, of counting relays 3 and 7. The stick circuit for relay RLP is completed at its own front contact *a* when the relay picks up, this circuit further including back contact *a* of relay L. The release of each of these repeater relays, when deenergized, is retarded slightly by the half-wave rectifier snub connected in multiple with the relay winding. These relays are thus shown to be slow release although the retardation period is of shorter duration than that of the corresponding relays in the first form. In addition to these first repeaters of the front and back contacts of relay L, cascaded second and third repeaters of each position of the neutral line relay are also provided. Cascaded behind relay NLP are relays NLPP and NLPPP, each of which is energized by a simple circuit completed at a front contact of the preceding relay in the cascaded chain of repeaters. Similarly, relays RLPP and RLPPP cascade the action of back contact repeater relay RLP, each of the other repeaters again being energized by a simple circuit including a front contact of the preceding relay in the chain. Both relays NLPP and RLPP are also snubbed by half-wave rectifiers connected in multiple with the relay winding so that their release is slightly retarded upon deenergization.

The line relays and their first and second repeaters together control the eight counting relays, one for each indication period in the scanning cycle. This control cascades down through the repeaters to energize the counting relays in numerical order. For example, the circuit for counting relay 1 may be traced from terminal B over front contact *a* of relay L, reverse contact *a* of relay LP, back contact *c* of relay NLP, front contact *c* of relay RLP, and the winding of relay 1 to terminal N. The circuit for relay 2 also includes front contact *a* of relay L and reverse contact *a* of relay LP, thence, front contact *c* of relay NLP, back contact *d* of relay RLP, and front contact *b* of relay RLPP. The contacts of the line repeater relays are used to interrupt these energizing circuits in order to divide the first line scanning period into two indication periods to double the count possible for each frequency tone. The circuits for counting relays 5 and 6, which are energized during the third line condition period of the scanning cycle, are similar in formation to those just traced for relays 1 and 2, which are energized during the first line period, with the exception that the circuits for relays 5 and 6 include normal contact *a* of relay LP instead of the corresponding reverse contact. However, the front and back contacts of repeater relays NLP(*d*), RLP(*e*, *f*), and RLPP(*c*) are similar in connection.

In the circuits for relays 3 and 4, which are energized during the second line period, a deenergized period, the connections over contacts of relays NLP and RLP are opposite to those used for relays 1 and 2, relay NLPP substitutes for relay RLPP, and a back contact of relay L, which is released under these conditions, is included. For example, the circuit for relay 3 is traced from terminal B over back contact *a* of relay L, reverse contact *b* of relay LP, front contact *e* of relay NLP, back contact *g* of relay RLP, and the winding of relay 3 to terminal N. The circuit for relay 4 also includes back contact *a* of relay L and reverse contact *b* of relay LP and thence back contact *e* of relay NLP, front contact *h* of relay RLP, and front contact *b* of relay NLPP. Circuits for relays 7 and 8 are similar in structure to those just traced for relays 3 and 4 except that they include normal contact *b* of relay LP since they are energized during the last line period of the scanning cycle. A complete operational description of the counting relays will be taken up later during the detailed description for this form of my invention.

Indication stick relays at the control office are controlled in the same manner as those in the first form. However, there are eight such relays for each tone receiver, providing that all eight indications are used, each having an energizing circuit completed when the correspondingly numbered counting relay is energized. Under these conditions, if the associated tone receiver is receiving carrier frequency current from the field, the circuit for the indication stick relay is completed to terminal N through the internal circuits of the receiver and the relay becomes energized. Stick circuits are provided to hold the relay energized during the time between assigned indication periods in successive scanning cycles. Further explanation is deemed unnecessary in view of the circuit description for the indication relays in the first form.

The transmitting relays are controlled jointly by the third line relay repeaters and by selected ones of the counting relays. For example, transmitting relay T, which is an ordinary neutral relay, is provided an energizing circuit including front contact *a* of relay RLPPP and back contact *a* of relay NLPPP. A stick circuit for this transmitting relay is completed at its own front contact *c* and further includes front contact *a* of relay RLPPP. Polar transmitting relay PT is of the magnetic stick type and has two windings. The circuit for the upper winding includes front contacts *b*, in series, of relays NLPPP and RLPPP and front contact *b* of counting relay 4. Flow of current in this circuit is in the direction of the arrow in the upper winding of relay PT so that this relay, under control of this circuit, will close its contacts in their normal position. The circuit for the lower winding of relay PT includes front contacts *b* of the two third line repeater relays and front contact *b* of counting relay 8. This circuit is so connected that the flow of current through the lower winding is in the direction opposite to the arrow so as to cause the relay to operate its contacts to their reverse position. It is to be noted that, since front contacts in series of relays NLPPP and RLPPP are used in each energizing circuit for relay PT while a back contact of relay NLPPP is in the energizing circuit for relay T, these two relays cannot operate simultaneously. A detailed operational description included later will make clear the reasons for this operation and the various contacts included in these energizing circuits.

Each station as shown in FIG. 2B is provided with a code receiving arrangement similar to that at the office location. That is, two line relays with half-wave rectifiers in the connections to the line circuit are provided at each location. These are designated by similar reference characters distinguished by the addition of a prefix as in the first form so that, at station 1, the line relays become relays F1L and F1LP. Similar designations are used at stations 2 and 3. At each station, relay FL detects the energization of the line circuit while relay FLP detects the polarity of that energization. The connections to the line circuit and the operation of the relays are identical to that already described for the registry unit at the office.

Depending upon the number of indicators at a station, relay FL may be provided with a front and a back contact repeater, with only one, or with none. At station 1, which is an example of a station having the full complement of eight indicators, front and back contact repeaters of relay F1L are provided, the relays F1NLP and F1RLP. Each is energized by a simple circuit including, respectively, front and back contact a of relay F1L. As are the similar relays at the office, each of these relays is snubbed by a half-wave rectifier in multiple with the relay winding to provide some retardation to the release of the relay upon deenergization. It will be noted, however, that these relays are energized directly over contacts of the neutral line relay without the intervention of contacts of counting relays.

Wayside indicators, again shown as relays TR, control in turn the transmission of the frequency tone to the office. As specifically shown in this form, the wayside indicators provide direct connection over their contacts from the power source to the tone transmitter without the intervention of a repeater relay as in the other relay form. The particular relay TR which controls during each indicating period in the scanning cycle is selected over contacts of line relays FL and FLP and, when necessary, contacts of front and back contact repeaters FNLP and FRLP, the latter relays being provided only when the number of indications at the station requires additional selection. For example, at station 1, contact a of relay 1TR is selected during the first indicating period over front contact a of relay F1RLP, reverse contact a of relay F1LP, and front contact b of relay F1L. At the same station, back contact a of relay 3TR is selected over front contact a of relay F1NLP, reverse contact b of relay F1LP, and back contact b of relay F1L.

At station No. 2, since only two indicators are used, proper selection can be accomplished without the use of line relay repeaters. Thus, at this station, selection is actually made by a single set of contacts of relay F2LP, the two indicators being selected over normal and reverse contacts a of this relay in conjunction with front contact b of relay F2L. At station 3, where are located four of the group of eight indicator relays which are divided between station 2 and station 3, a single line repeater relay provides the necessary additional selection when taken in connection with a set of contacts of relay F3LP and back contact b of relay F3L, this last contact differentiating from the corresponding front contact of relay F2L used at station 2. The joint arrangement shown at stations 2 and 3, of course, is uneconomical when using this eight indication system but is here shown in order to provide a complete understanding of the operation of the system. It is to be noted, however, that at the field stations in this form of the invention, the relays which are not required to complete the selection of the indicators can be eliminated.

Referring now to FIGS. 5A and 5B, a transistorized form of the system of my invention is shown which is similar in operation to the first form shown in FIGS. 1A and 1B. In other words, the transistorized form as shown provides four indications for each carrier frequency tone used. It is to be noted that, in the registry location shown in FIG. 5A, the counting relays and the indication stick relays are used in the same manner as in the first form of my invention. The control of the indication stick relays is identical with that shown in FIG. 1A, and thus will not be described in detail. Briefly, the circuits are completed over contacts of the corresponding counting relay and through the tone receiver when it is activated by carrier current from the stations. However, the circuits for energizing counting relays 1, 2, 3, and 4 are controlled by the transistor network used as part of the registry unit. With the exception, then, of the indication stick relays and the counting relays, the remainder of the registry unit shown in FIG. 1A is now replaced by a transistorized switching network. This switching circuit is herein described only briefly, being described in complete detail and claimed in the aforementioned copending Sparrow and Luft application Serial No. 34,794. This transistor circuit network is shown within the dot-dash rectangle designated as registry unit R—R. Actually, in practice, counting relays 1, 2, 3, and 4 will also be included within registry unit R—R but are here shown outside for discussion and comparison purposes with the other forms of my invention.

The line connections of the transistor switching circuit, that is, the registry unit, are connected across the line circuit, symbolized by terminals L1 and L2 in the upper right of this figure, through inductor 32 and resistor 33 which serve to block carrier current from the transistor network. This circuit network is centered about a bistable multivibrator circuit of the usual form comprising, principally, transistors 111 and 112. These transistors are p-n-p junction type transistors as shown by the conventional symbol here used. It is to be noted that, where this particular symbol is used for other transistors in the circuits in FIGS. 5A and 5B, the p-n-p junction type transistor is designated. Other transistors are of the n-p-n junction type and are designated by the symbol such as used for transistor 117 in the upper left of the registry unit. The multivibrator circuit arrangement is used to detect the polarity of the line circuit and to further hold the indication of the last polarity when the line circuit is deenergized, as will be shortly discussed. Each of the transistors 111 and 112 has associated therewith two switching transistors, transistors 113 and 114 being associated with transistor 111 and transistors 115 and 116 with transistor 112. Each of these pairs of switching transistors, when the associated transistor of the bistable circuit is in its conducting condition, is used to detect or distinguish between the energized and deenergized conditions of the line circuit. The switching of these transistors between conducting and nonconducting condition causes similar operation of the power transistors 117, 118, 119, and 120 through the corresponding capacitors 17 to 20, inclusive. These capacitors, as will be more fully explained hereinafter, are used to limit the time during which the power transistors, when actuated to their conducting condition, remain in this particular condition. Counting relays 1, 2, 3, and 4 are then energized in turn through the various power transistors as they successively assume their conducting condition. Circuits are so arranged that the counting relay energized during a particular line period of a scanning cycle is deenergized and releases prior to the end of this particular period. The details of operation of this registry unit circuit network will be more fully discussed during the operational description of this form of my invention.

The three transmitting relays of FIG. 1A are here replaced by the transmitting unit TU shown in the upper portion of FIG. 5A. Since this unit TU and its operation is described in complete detail in the aforementioned Luft and Sparrow application Serial No. 107,540, only sufficient detail is supplied herein to allow an understanding of this form of the system of my invention. Power is supplied for the operation of unit TU and for application to the line circuit L1—L2 from line battery LB which in this form must be provided with a center tap terminal C. Transmitting unit TU comprises, in the first section, a low frequency oscillator of any well known form but shown as employing two junction type transistors 101 and 102, the former being an n-p-n type while the latter is of the p-n-p type. The output of this oscillator, in the form of a sine wave, is fed through transformer 25 into a transistorized balanced squaring network which is comprised of two series of cascade connected amplifiers. One-half of the network includes transistors 103, 105, and 107 while the other half includes transistors 104, 106, and 108. In the series of transistors in each half of the network, the junction type transistors alternate between the n-p-n and p-n-p types, the first pair, transistors 103 and 104, being of opposite types. Due to the delay resulting from the reverse bias voltages applied to the various transistors in this squaring network and with the input signal strength causing saturation of each transistor when that series of transistors is actuated into its conducting state, the output from unit TU into the line circuit follows the square wave form designated in FIG. 6 as the output of TU. This wave form is identical with the code provided by the transmitting relays in either of the other two forms of this invention. The operation of transmitting unit TU will be taken up in more detail later in this specification.

Each station is provided with a transistorized code receiving network which is similar to the network of registry unit R—R at the office location, with the exception that no power transistors are provided since no final counting relays need be energized by this circuit network. Rather, energy is supplied at the proper times in the cycle to a carrier tone transmitter. The station receiving unit RU1 at station 1 is connected across the line circuit through inductor 132 and resistor 133 in a manner similar to the office registry unit. This unit includes, in a manner similar to registry unit R—R, the bistable multivibrator circuit including transistors 121 and 122. Associated with each of these transistors is a pair of switching transistors, transistors 123 and 124 being associated with transistor 121 while transistor 122 has associated therewith transistors 125 and 126. The whole network operates in a manner similar to that of registry unit R—R, the action of transistors 121 and 122 detecting and remembering the polarity of the energy supplied to the line circuit while each pair of switching transistors, when the associated multivibrator transistor is conducting, serve to distinguish between the energized and deenergized conditions of the line circuit. It is thus evident that receiving unit RU1 at station 1 sets up four successive conditions during each scanning cycle.

In addition, each station is provided, as in the other forms, with a carrier tone transmitter, shown by conventional block diagram, with connections to line circuit terminals L1 and L2. As before, this tone transmitter may be of any type but is here considered to be of such type that carrier current of the assigned frequency is transmitted while the unit is energized. Energy from the proper source is supplied to the carrier tone transmitter over contacts of indicator relays TR or TP through the receiving unit in accordance with the line condition period of the scanning cycle, this action being taken up in more detail hereinafter. Since receiving units RU2 and RU3 at stations 2 and 3 are identical in form and arrangement with the circuit shown for unit RU1, these receiving units have been shown by conventional dot-dash rectangles having terminals with designations similar to the terminals shown in unit RU1. Only the external connections to these terminals that are provided at each station are shown in detail. It is believed that the entire operation may be explained using these conventional showings in order to simplify the drawings.

I shall now describe the operation of the first form of my invention as shown in FIGS. 1A and 1B. Reference is also made during this explanation to the relay timing chart of FIG. 3 which provides a schematic showing of the relative timing of the relay operations. In the construction of this chart, and also the chart shown in FIG. 4 for the other relay form of the invention, the position of the ordinary type neutral relays is indicated by the horizontal line extending to the right from the relay designation. For each relay, a solid line in the upper position indicates that the relay is energized and picked up. The solid line in the lower position indicates that the relay is in its released position. Dotted lines in the upper position indicate that period of time during which the relay is deenergized but because of slow release characteristics has not yet released. The beginning of a period where a relay is held energized only by its stick circuit is marked by a letter $s$ along the picked-up position line. Arbitrary periods of time indicated by the sloped lines are selected for the pick up and release action of the neutral relays. Magnetic stick type relays, such as line relays LP, are shown in their normal or reverse position by solid lines in the upper or lower position, respectively, in the horizontal chart.

Where a group of relays has a similar type operation and are therefore shown on a common line in the chart, such as the office indication stick relays TK or the repeater relays TP at the field stations, the actual relay shown as picking up or releasing at any particular point in the chart is designated by numerals at that point. The operation of these relays as actually shown is in keeping with the conditions assumed to exist at the remote stations among the indicator relays, as described in the succeeding paragraph. It is also to be understood that these charts are not necessarily constructed to any exact scale, the arbitrary slow release periods and the periods for the pick up and release actions of the various relays being selected for illustration purposes only to provide a better understanding of the relay action during the scanning cycle. Vertical lines which intersect the horizontal relay position lines at various places are intended to give some idea of the related actions between the various relays, that is, that the pick up or release of a particular relay has an effect upon the condition of another relay. Due to the complexity of the operation, the interrelation between the various relays cannot be shown in any more simple manner.

For purposes of this explanation, it will be assumed that, at the field stations, indicator relays 1TR, 2TR, 4TR, 5TR, and 7TR occupy their released positions so that their back contacts $a$ are closed. Under these conditions, a positive indication, that is, transmission of carrier tone, will result during the period of the scanning cycle to which these relays are assigned. It is to be noted that each of the indicator relays at the field stations is shown in the position in which it is herein assumed to occupy for the description.

This operational description starts at the instant that relay T at the office releases and closes its back contacts $a$ and $b$ but prior to the time that any other relay in the system has reacted to this reenergization of the line circuit. Relays T1 and T2 occupy positions as shown in FIG. 1A. The closing of back contacts $a$ and $b$ of relay T reenergizes the line circuit with positive polarity on line L1. This line circuit arrangement and its operation were previously explained and the manner of energization of the line circuit is obvious. At this time then, at all locations, line relays L are energized and pick up while line relays LP are energized in a manner to cause them to operate to close their contacts in the reverse position. This occurs because, as will be seen with line L1 positive, the flow of current through the winding of relay LP at each location is opposite to the direction of the arrow so that the relay reverses its contacts.

The opening of front contact c of relay T deenergizes relay T1 since its stick circuit is presently open at front contacts c of relays 1 and 3. However, relay T1 is provided with slow release characteristics assisted by the resistor-capacitor snub connected in multiple with the relay winding over its own front contact c. Thus, although relay T1 is deenergized, it does not release at this time and, as indicated in FIG. 3, prior to its release the stick circuit will be closed at front contact c of relay 1 so that relay T1 will be reenergized and hold in its picked up position. The actual slow release time period provided for relay T1, and also for relay T2, is not critical except that it must be sufficient to bridge the deenergized period just described without releasing. Relay T1 must also hold for sufficient time, when again deenergized, to allow the relays 1 in all registry units of the system to release prior to the release of relay T1 to terminate the first line period of the scanning cycle, as will be discussed shortly.

At the office, when relay L picks up, the closing of its front contact a energizes relay NLP which immediately picks up. The opening of the corresponding back contact a deenergizes relay RLP which, because of its slow release characteristics, holds its front contacts closed for a period of time. The exact period of retardation of relay RLP, and also of relay NLP, has no particular significance except that it must be long enough to allow the occurrence of certain actions by the counting relays and to maintain these counting relays in an energized position for a length of time sufficient to operate the indication relays TK. In other words, the timing is not unduly critical within these limits. With relays L and RLP in their picked up positions, counting relay 1 is energized and picks up. This latter relay completes at its front contact c the stick circuit for relay T1 which is thus reenergized and continues to hold its front contacts closed.

At both station 1 and station 2, with relay FL picked up and relay FLP in its reverse position, relay TP is energized since the indicator relay assigned to this period of the scanning cycle has its contact closed. For example, with relay 1TR at station 1 released, an energizing circuit is traced from terminal B over back contact a of relay 1TR, reverse contact a of relay F1LP, front contact a of relay F1L, and the winding of relay TP1 to terminal N. Relay TP1, probably previously picked up during the preceding cycle due to the closed back contact a of indicator relay 4TR, thus continues to hold its front contact a closed. A similar circuit exists at station 2 including back contact a of relay 5TR, reverse contact a of relay F2LP, and front contact a of relay F2L. At station 3, no indicator is assigned to this period of the scanning cycle so that relay TP3 remains released. With relays TP1 and TP2 energized and picked up, the No. 1 tone transmitter at station 1 and the No. 2 tone transmitter at station 2 are activated and transmit carrier current of the assigned frequencies. The No. 1 and No. 2 tone receivers at the office are then activated by the reception of these carrier currents to complete the internal connection between each terminal —R and terminal N of the local source. With relay 1 picked up, circuits are thus completed, as previously described, to energize relays 1TK, and 5TK, which pick up to register, respectively, the positive indications transmitted from stations 1 and 2 reflecting the deenergized condition of indicators 1TR and 5TR, respectively.

Relay RLP at the office, which was deenergized as previously described, now releases at the end of its slow release period. This action obviously deenergizes counting relay 1 which shortly releases. The half-wave rectifier in multiple with the winding of this counting relay and similar units associated with the other counting relays are principally to provide protection to the contacts in the controlling circuits for these counting always rather than to provide any slow release characteristics to the relay. Inherently, of course, a slight retardation results from the use of this half-wave rectifier but it is of no actual concern in the operation of the system. Release of reply 1 to open its front contacts a and b interrupts the energizing circuits for indication relays 1TK and 5TK, but stick circuits for each of these relays are immediately completed over corresponding back contacts of relay 1 so that the indication relays remain energized and hold the indication recorded. The opening of front contact c of relay 1 interrupts the stick circuit for relay T1. This relay, although deenergized, holds its front contacts closed until the expiration of the slow release period provided by the capacitor-resistor snub. As previously stated, the actual release period of relay T1 is not critical. The time period must be long enough only to assure that relays 1 in all registry units used in this system at other registry points have had time to release before the line circuit is opened.

When relay T1 finally releases, the opening of its front contacts a and b interrupts the line circuit supply thus deenergizing the line. This ends the first period of the scanning cycle. The line relays L at all locations are deenergized and shortly release. However, the line relays LP, being of the magnetic stick type, hold their contacts in the reverse position which they presently occupy. At the office, the release of relay L deenergizes relay NLP and energizes relay RLP. However, relay NLP, although deenergized, holds its front contacts closed for the duration of its slow release period. With front contact a of relay NLP remaining closed, the closing of back contact b of relay L energizes counting relay 2, the circuit further including reverse contact b of relay LP. Thus energized, relay 2 picks up, closing its front contact c to reenergize relay T which also picks up. However, this has no effect on the line circuit at this instant since the open front contacts of relay T1 already prevent energy from reaching terminals L1 and L2. Although front contact c of relay T closes in the circuit for relay T1, this circuit remains open at normal contact b of relay LP, as well as back contact b of relay NLP during the slow release period of this latter relay. The closing of front contacts a and b of relay 2 complete the energizing circuits for relays 2TK and 6TK to the —R terminals of the two tone receivers in preparation for the recording of any indications from the stations at this time.

At each of the various stations, the release of relay FL with relay FLP holding in its reverse position connects the second indicator contact to relay TP. At station 3, since again there is no indicator assigned to this period of the scanning cycle, relay TP3 remains released. At station 2, with relay 6TR energized, so that its back contact a is open, the circuit for relay TP2 is interrupted and this relay releases. At station 1, with back contact a of relay 2TR assumed to be closed, the circuit for relay TP1 is complete so that this relay remains energized. Thus, the No. 1 tone transmitter remains active to transmit carrier current of its assigned frequency. At the office, the No. 1 tone receiver continues to receive carrier current of its assigned frequency from station 1 and remains in an active state. With relay 2 picked up, the circuit for relay 2TK is completed through the internal circuitry of the No. 1 tone receiver and this indication stick relay is energized. The No. 2 tone receiver is now inactive since no carrier current is being transmitted from station 2. Thus, terminal —R of this receiver is no longer connected to terminal N and relay 6TK is not energized. When relay 2 eventually releases, as will be described, the stick circuit for relay 2TK is completed over back contact a of relay 2 and this indication relay holds recorded the indication received from station 1.

When relay NLP at the office eventually releases, it interrupts the circuit for relay 2 which, thus deenergized, shortly releases. The opening of front contact c of relay 2 deenergizes transmitting relay T which, however, holds its front contacts closed for its slow release period. The exact amount of retardation on relay T is of no particular significance except that it must be sufficient to allow relay T2 to pick up, as will be shortly described, and must also insure that relay T does not release to terminate the second period of the scanning cycle before the relays 2 of all registery units have released. With relay T holding its front contact d closed and with the continued deenergization of the line circuit holding back contact b of relay L closed, the cascaded release of relays NLP and 2 to close, respectively, back contacts a and d completes the circuit for energizing relay T2 which thus picks up. The closing of front contacts a and b of relay T2 has no immediate effect upon the line circuit since back contacts of relay T are still open to hold the line circuit deenergized. However, when relay T releases at the termination of its slow release period to close its back contacts a and b, the circuits to terminals L1 and L2 at the office from line battery LB are again complete so that the line circuit is reenergized. However, the polarity of this energy is now reversed as is apparent from the drawings since the circuit is completed over front contacts a and b of relay T2. Thus the relative polarity of the line circuit is now that in which line L2 has the positive polarity. This release of relay T ends the second period of the scanning cycle and initiates the third period.

With the line reenergized, line relays L at all locations again pick up and line relays LP, since the polarity of the line circuit is reversed so that line L2 is positive, operate their contacts to close in their normal position, as was previously described. At the office, the pick up of relay L reenergizes relay NLP, which picks up, and deenergizes relay RLP which, as before, holds its front contacts closed for the present due to its slow release characteristics. With the closing of front contact b of relay L and normal contact a of relay LP, and with front contact b of relay RLP held closed for a period, the circuit is complete for energizing counting relay 3 which thus picks up. The closing of front contact c of relay 3 completes the stick circuit for relay T2, which was previously deenergized by the opening of front contact d of relay T. However, as previously described for relay T1, the slow release period of relay T2 is sufficient to bridge this deenergized period so that front contacts of relay T2 remain closed until the relay is reenergized by its stick circuit. As described for relay T1, the timing period assigned to relay T2 is not critical but must be sufficient to bridge this gap in the energization of the relay winding. The closing of front contacts a and b of relay 3, in the manner similar to that previously described for other counting relays, completes the circuits for relays 3TK and 7TK to terminal —R of the No. 1 and No. 2 tone receivers, respectively.

At the various stations, with relay FL picked up and relay FLP in its normal position, the winding of relay TP is connected to the contacts of the third period indicators. It is obvious that, at station 2, no indicator is assigned to the third period so that relay TP releases or remains released depending upon its previous condition. The No. 2 tone transmitter at this station thus remains inactive during this period of the scanning cycle. At station 1, it was previously assumed that relay 3TR was picked up. Since this relay is assigned to the third period, its open back contact a interrupts the circuit over normal contact a of relay FL1P and front contact a of relay F1L so that relay TP1 is deenergized and releases, opening its front contact a to deactivate the No. 1 tone transmitter. However, at station 3, the assumed condition of indicator 7TR, assigned to the third period, closes its back contact a to complete the circuit, further including normal contact a of relay F3LP and front contact a of relay F3L, so that energy is supplied to the winding of relay TP3 which picks up. The No. 2 tone transmitter at station 3 is thus activated and transmits over the line circuit carrier current of its assigned frequency. It should be noted that, with the four possible indicators for the No. 2 tone being split between the two stations, the tone transmitter at field station 3 has thus taken over in lieu of the transmitter at station 2.

At the office, the No. 1 tone receiver is now not active and interrupts the internal circuit to terminal N from its terminal —R. Relay 3TK thus is not energized at this time and remains in its released position or releases depending upon its previous condition. However, the No. 2 tone receiver is active, completing its internal circuit from terminal —R to terminal N of the source to close the energizing circuit for relay 7TK which picks up. When relay 3 at the office eventually releases, a stick circuit for 7TK is completed over back contact b of relay 3 and this indication stick relay retains the positive indication received from the field station.

When relay RLP at the office eventually releases, the opening of its front contact b deenergizes relay 3 which shortly releases. The opening of front contact c of this latter relay interrupts the stick circuit for relay T2 thus deenergizing this relay. However, relay T2 holds its front contacts closed for the duration of its slow release period. This is similar to the action of relay T1, previously described, during the first period of the scanning cycle. So that the action and timing will be the same, the same capacitor-resistor snub is used for each of these transmitting relays, the snubbing circuit being completed over the front contact of the relay that also completes the corresponding stick circuit. When relay T2 eventually releases, the opening of its front contacts a and b interrupts the supply of energy to the line circuit terminals L1 and L2, deenergizing the line circuit so that all line relays L release. However, the line relays LP, being of the magnetic stick type, again hold their contacts in the last operated position, here the normal position. The release of relay T2 terminates the third period of the scanning cycle and initiates the fourth and final period of the cycle.

The release of relay L at the office reenergizes relay RLP which picks up. The opening of front contact a of relay L also deenergizes relay NLP which, as previously described, holds for its slow release period. With relay L released, relay LP in its normal position, and relay NLP still holding its front contacts closed, the circuit previously traced for relay 4 is complete and this latter relay picks up. The closing of front contact c of relay 4 reenergizes transmitting relay T which picks up to open its back contacts a and b. However, this has no effect on the line circuit which is already deenergized due to the release of relay T2. The closing of front contact c of relay T does not energize relay T1 since its energizing circuit at this time is open at back contact d of relay 4. The closing of front contacts a and b of relay 4 completes the connections to terminal —R of the two tone receivers for relays 4TK and 8TK, respectively.

At the stations, the release of relays FL with relays FLP remaining in a normal position connects the contacts of the fourth period indicators to the winding of relay TP. Again at station 2, as for period three, no indicator is assigned to period four so that relay TP2 remains in its released position, the No. 2 tone transmitter at that station remaining inactive. At station 1, it is assumed that indicator 4TR is released with its back contact a closed. The circuit, which further includes normal contact b of relay F1LP and back contact a of relay F1L, is thus complete for energizing relay TP1. This latter relay picks up, closing its front contact a to activate the No. 1 tone transmitter which transmits over the line circuit carrier current of the assigned frequency. At station 3, it is assumed that indicator 8TR is picked up so that its back contact a is open. The fourth period circuit for relay TP3 is thus interrupted and this latter relay releases, opening its front contact a to deactivate the No. 2 tone transmitter. Thus, under the assumed conditions, during this fourth period of the scanning cycle carrier current of the No. 2 frequency does not appear on the line circuit.

At the office, only the No. 1 tone receiver is activated under these conditions to complete the internal circuit from its terminal —R to terminal N of the local source. Indication relay 4TK is thus energized and picks up while relay 8TK associated with the No. 2 tone receiver receives no energy and remains in its released position. When relay 4 eventually releases, the stick circuit for relay 4TK holds this indication relay energized to continue to register the received indication.

At the office, relay NLP eventually releases and the opening of its front contact b deenergizes relay 4 which shortly releases. The release of relay 4 opens its front contact c to interrupt the circuit for relay T which, however, holds its front contacts closed and back contacts open for its slow release period. When relay 4 releases the closing of its back contact d, with back contact b of relay NLP, normal contact b of relay LP, and back contact b of relay L also closed, completes the circuit over front contact c of relay T, presently held closed, to energize relay T1 which picks up. When relay T eventually releases to close its back contacts a and b, front contacts a and b of relay T1 are thus already closed so that energy is again supplied to line terminals L1 and L2, now with positive polarity, that is, with terminal L1 connected to the positive terminal of battery LB. This release of relay T ends the fourth period of the scanning cycle and also the scanning cycle itself. Reenergization of the line circuit here is identical with that described at the beginning of the scanning cycle so that a new cycle is initiated which will be identical in operation with that just described. The various rleays TK already energized hold until their assigned period in the scanning cycle again occurs. Then they are reenergized or deenergized according to the position of the station indicators at that time. The scanning cycles continue in succession without interruption so that the indication relays are frequently conditioned to correspond with the condition of the respective indicators at the various field stations.

Referring now to FIGS. 2A, 2B, and 4, I shall describe the operation of the second form of my invention, that is, the form in which eight indications are transmitted over each carrier frequency tone. FIG. 4 is a relay time chart for this second form of my invention similar to that shown in FIG. 3 for the first form. The details of construction of this chart have been previously described in conjunction with FIG. 3, but one additional item should be noted. The bottom line in the chart, designated TR, is not an indication of relay operation but an indication of the periods of the cycle during which the contacts of the indicators TR at the three field stations shown in FIG. 2B are connected to control the corresponding tone transmitters. As will develop during the following description, this line illustrates that there is no overlapping in the transmission of the frequencies as controlled by the various indicators so that proper registration of the field indications is possible during the cycle.

In the time chart of FIG. 4, and in the conditions of the relays shown in FIGS. 2A and 2B, it is assumed that relay T at the office has just picked up, energized through the circuit including front contact a of relay RLPPP and back contact a of relay NLPPP. The closing of front contacts a and b of relay T at this instant, with contacts a and b of relay PT in their reverse position, energizes the line circuit with negative polarity, that is, with terminal L2 in FIG. 2A having the relative positive polarity. This of course is opposite to the initial condition of the scanning cycle used in the description for the first form of my invention. However, the point at which the description begins in this continuously operating system is immaterial and it is more convenient for purposes of the description to begin at this instant. The other initial relay positions as shown in the timing chart and in the circuit diagrams are those existing at this instant when the line is just reenergized. Certain relay actions occur immediately and it is with these actions that the description begins as the scanning cycle shown in FIG. 4 is initiated. Further assumptions for purposes of the description are that, at station 1, the indicators shown as relays 1, 2, 5, and 8TR are released, that is, have their back contacts closed to provide positive indications. At stations 2 and 3, each of which has a partial complement of the indicators assigned to the second carrier frequency tone, relays 9, 11, 12, and 15TR are released to provide positive indications.

When the contacts of relay T close the line circuit, with line L2 positive, all neutral line relays at the various locations are energized and pick up while polar line relays operate their contacts to the reverse position. At the office, with relay L picked up and relay LP in its reverse position, the circuit is complete for energizing counting relay 1. Under these conditions, the circuit includes front contact a of relay L, reverse contact a of relay LP, back contact c of relay NLP, and front contact c of relay RLP. It is to be noted that relays RLP, RLPP, and RLPPP were energized during the final line period of the preceding scanning cycle. Relay RLP is retained energized by its stick circuit, which includes back contact a of relay L and front contact a and the winding of RLP. When relay L picks up, it opens its back contact a to interrupt the stick circuit for relay RLP. However, the latter relay holds its front contacts closed for a period as determined by the half-wave rectifier snub connected in multiple with the relay winding. The timing of the release of relay RLP is not particularly critical but must be of sufficient length to allow certain other relay actions to occur, as will appear as the description advances.

At the various stations, with relay FL picked up, its front contact repeater relay FNLP is energized while back contact repeater relay FRLP is deenergized. This latter relay, of course, holds its front contacts closed for a time due to the effect of the half-wave rectifier snub, as at the office. This energizing and deenergizing action of the repeater relays occurs only at the stations, as is obvious from an examination of FIG. 2B, where front and back contact repeated relays are provided as required by the number of indicators associated with the station.

At station 1, the contact of indicator 1TR is connected to the No. 1 tone transmitter over the circuit including front contact a of relay F1RLP, reverse contact a of relay F1LP, and front contact b of relay F1L. Since, as assumed at the beginning of the description, relay 1TR is released, the circuit is complete for energizing or activating this No. 1 tone transmitter to transmit carrier current of its assigned frequency over the line circuit. This circuit for activating this transmitter exists (see last line of FIG. 4) until relay F1RLP releases to open its front contact a. At station 2, where only two indicators are necessary, only contacts of relays F2L and F2LP are used in the circuit for selecting the indicator contact which is to be connected with the tone transmitter. Under the existing conditions, this No. 2 tone transmitter is energized, over the circuit which includes back contact a of indicator 9TR (assumed to be closed), reverse contact a of relay F2LP, and front contact b of relay F2L, and transmits carrier current of its assigned frequency until the circuit is interrupted. This latter action occurs when relay F2L later releases to open its front contact a, which will be shortly described. However, although the transmission of the carrier tone exists for longer than the actual indicating period, the office apparatus controls the recording circuits to assure that only proper registry of this indication is obtained. At station 3, no circuit exists over front contact b of relay F3L for energizing the tone transmitter at this location.

At the office, with relay 1 picked up, relay 1TK is connected, over front contact a of relay 1, to terminal —R of the No. 1 tone receiver. This receiver is activated at this time by the carrier current of corresponding frequency received from the No. 1 tone transmitter at station 1. The No. 1 tone receiver accordingly completes an internal circuit from its terminal —R to its connection to terminal N of the local source and thus energizes relay 1TK, which picks up. As in the first form, the eventual release of relay 1 completes a stick circuit for relay 1TK including back contact a of relay 1 and front contact a and the winding of relay 1TK. Each of the TK relays shown has a similar stick circuit so that an energized TK relay is retained energized, to hold the positive indication recorded, when the corresponding counting relay releases. No further mention will be made of these stick circuits and it will be understood that such action occurs for each TK relay, if energized during its assigned indication period. The No. 2 tone receiver is also activated during this first indicating period and completes an internal connection between its terminal —R and terminal N. Indication stick relays 9 to 16TK (not shown) are associated with the No. 2 tone receiver and correspond, respectively, with the indicators 9 to 16TR at the stations. Normally, only those TK relays in a group are provided which correspond to the existing indicators in the corresponding group at the stations. Since the circuits for the relays 9TK to 16TK are similar to those shown for relays 1TK to 8TK, respectively, it is believed to be unnecessary to show or describe them in detail. Brief references to these relays will be made at the proper times during the operational description. For example, during this first indicating period, with the No. 2 tone receiver activated, relay 9TK is energized over another front contact of relay 1.

With front contact a of relay L closed, the closing of front contact b of relay 1 energizes repeater relay NLP which picks up and immediately completes its stick circuit including its own front contact a and front contact a of relay L. The pickup of relay NLP is followed in cascade by the energization and pickup of its repeater relays NLPP and NLPPP. The opening of back contact c of relay NLP deenergizes counting relay 1 which immediately releases. It is to be noted that the circuit for energizing relay NLP includes a front contact of relay 1 to assure that this latter relay picks up to establish the registration of the received indication prior to the energization of relay NLP which causes the release of the counting relay. At the stations, incidentally, relay FNLP picks up earlier than corresponding relay NLP at the office since the station action is controlled directly by a front contact of line relay FL. The release of relay RLP at or shortly after this time ends the first indicating period at approximately the same time that, or slightly later than, relay 1 releases.

The closing of back contact d of relay RLP completes the circuit for energizing relay 2, this circuit further including front contact b of relay RLPP and front contact c of relay NLP. The release of relay RLP also initiates the cascaded release action of relays RLPP and RLPPP. Relay RLPP holds, after deenergization, for a slow release period of a selected time interval, which must be of sufficient length to allow counting relay 2 to pick up to permit the registry of the indications from the stations. The closing of front contact a of relay 2 connects indication stick relay 2TK to the —R terminal bus of the No. 1 tone receiver. The closing of other front contacts (not shown) of relay 2 will connect such other relays as are assigned to this second indication period to corresponding terminals on other tone receivers.

At station 1, relay F1RLP releases substantially at the same time as the corresponding office relay to connect, over its back contact a, the contact of indicator 2TR to the No. 1 tone transmitter. Since back contact a of indicator 2TR is closed, the No. 1 tone transmitter remains activated to transmit carrier current of its frequency over the line circuit. At station 2, the circuit remains complete for energizing the No. 2 tone transmitter so that carrier current of this frequency is likewise transmitted although there will be no receiving circuits at the office at this time, the indication of indicator 9TR having already been recorded during the first indicating period. At station 3, the lack of action continues, since there are no connections over the front contact b of relay F3L to complete a circuit for energizing the No. 2 tone transmitter. This must be true since, with circuits as shown, any indications during the first two indicating periods of the scanning cycle, that is, during the first complete line period of the scanning cycle, are allotted to station 2. The indication transmitted from station 1 by the No. 1 tone transmitter at this time will be recorded at the office by relay 2TK which is energized by the No. 1 tone receiver, as was previously indicated.

When relay RLPP eventually releases, the opening of its front contact b deenergizes relay 2 which releases to end this second recording period. The third cascaded repeater relay RLPPP also releases shortly afterwards. The opening of front contact a of relay RLPPP deenergizes relay T by interrupting its stick circuit, the energizing circuit already having opened at back contact a of relay NLPPP. Relay T immediately releases, opening its front contacts a and b to interrupt the energization of the line circuit, ending the first line period of the scanning cycle. It will be noted, as previously mentioned, that this ends the second indicating period of the cycle, there being two indicating periods for each line period in this arrangement embodying the second form of my invention.

The deenergization of the line circuit causes all line relays to release. However, the polar line relays hold in their existing position with reverse contacts closed. At the office, release of relay L, closing its back contact a, completes the circuit further including reverse contact b of relay LP, front contact e of relay NLP, and back contact g of relay RLP for energizing counting relay 3. The opening of front contact a of relay L interrupts the stick circuit for relay NLP which, although deenergized, holds its front contacts closed for the duration of its release period. The closing of front contact b of relay 3 completes the energizing circuit for relay RLP which picks up to initiate the cascaded pick up action of its repeater relays RLPP and RLPPP. The closing of front contact a of relay 3 connects indicating relay 3TK to the —R terminal bus of the No. 1 tone receiver. Similar connections will be made, for other indicating relays assigned to this period, to the bus connections to other tone receivers used in the installation.

At the various stations, the release of line relays FL deenergizes the associated repeater relays FNLP, where such are provided, but these relays hold their contacts closed for their release period. At the same time, the corresponding relays FRLP are energized and pick up, this latter action occurring slightly before the energization and pick up of relay RLP at the office. At station 1, this action connects contact a of indicator 3TR to the No. 1 tone transmitter, the circuit including front contact a of relay F1NLP, reverse contact b of relay F1LP, and back contact b of relay F1L. However, at the present time, since back contact a of relay 3TR is open, the No. 1 tone transmitter is not energized and carrier current of the corresponding frequency is not trdansmitted during this indicating period. At station 2, no connections to any indicator contact exist over back contact b of relay F2L so that the tone transmitter at this station cannot be activated. At station 3, contact a of indicator TR11 is connected to the No. 2 tone transmitter at that station while relay F3NLP holds its front contact a closed, the circuit further including reverse contact b of relay F3LP and back contact b of relay F3L. Since back contact a of indicator 11TR is closed, the No. 2 tone transmitter at this station is energized and transmits carrier current of the assigned frequency. At the office, reception of carrier current of this frequency activates the No. 2 tone receiver to cause the corresponding indication stick relay 11TK, not shown but which is one of the group connected to this receiver, to become energized. Since the No. 1 tone receiver is non-activated at this time, relay 3TK is not energized or if previously energized, releases at this time.

At the office, relay RLP picks up, opening its back contact *g* to interrupt the energization of relay 3 which releases immediately to end the third recording period. Relay NLP releases at approximately the same time as relay 3, initiating the cascaded deenergization and release of relays NLPP and NLPPP. It is to be noted that the release of relay NLPP is delayed for a time length sufficient to allow the operation of counting relay 4 which will now be described. Closing of back contact *e* of relay NLP completes the circuit, further including back contact *a* of relay L, reverse contact *b* of relay LP, front contact *h* of relay RLP, and front contact *b* of relay NLPP, to energize counting relay 4 which picks up. The closing of front contact *a* of relay 4 connects relay 4TK to the —R terminal bus of the No. 1 tone receiver and likewise connects similar indication stick relays of the groups associated with other tone receivers to the similar terminal on these other receivers. Also at this time, when relay RLPPP picks up with relays 4 and NLPPP already picked up, a circuit is completed for the upper winding of relay PT. This circuit includes front contacts *b* of relays NLPPP and RLPPP, and front contact *b* of relay 4. It is obvious that the flow of current through the relay winding is in the same direction as the arrow shown within the winding symbol so that relay PT operates its contacts to their normal position. However, this movement of its contacts from reverse to normal position has no effect upon the line circuit energization at this time since front contacts *a* and *b* of relay T are still open to deenergize the complete line circuit.

Meanwhile, when relays FNLP at stations 1 and 3 release, contacts *a* of indicators 4TR and 12TR, respectively, are connected to the tone transmitters at the respective stations. With relay 4TR picked up so that its back contact *a* is open, no energy is supplied to the No. 1 tone transmitters and carrier current of the corresponding frequency is not transmitted at this time. At station 3, with back contact *a* of indicator 12TR closed, energy is supplied to the No. 2 tone transmitter which continues to transmit carrier current of the corresponding frequency over the line circuit. The tone transmitter at station 2 remains inactive since no circuits are available for its energization. At the office, the No. 2 tone receiver is active so that relay 12TK, not actually shown but connected by a front contact of relay 4 to the —R terminal of this receiver, is thus energized. Since the No. 1 receiver is non-active, relay 4TK is not energized during this scanning cycle.

When relay NLPP releases at the end of its timing period, the opening of its front contact *b* deenergizes relay 4 which immediately releases. It is to be noted that the opening of front contact *b* of relay 4 has no operational effect upon relay PT which is of the magnetic stick type and thus retains its contacts in their existing position when deenergized. The release of relay NLPPP, to terminate the cascaded release action of the front contact repeaters of line relay L, completes, at its back contact *a*, the circuit for energizing relay T, the circuit having been previously prepared by the closing of front contact *a* of relay RLPPP. Relay T picks up, closing its front contacts *a* and *b* to complete again the line circuit which is now energized with positive polarity since contacts *a* and *b* of relay PT are closed in their normal position. In other words, the line circuit is reenergized with terminal or line wire L1 having the relative positive polarity. This action ends the second line period of the scanning cycle and initiates the third period.

When the line circuit is reenergized with positive polarity, all line relays L are energized and pick up while line relays LP operate their contacts to the normal position. At the various stations where such repeater relays are provided, relays FNLP are thus reenergized and pick up and relays FRLP are deenergized, but hold their contacts closed for their slow release period. At station 1, the contact of indicator 5TR is connected to the tone transmitter, until relay F1RLP releases, over front contact *b* of relay F1RLP, normal contact *a* of relay F1LP, and front contact *b* of relay F1L. Since contact *a* of indicator 5TR is closed for a positive indication, carrier current is transmitted by the No. 1 tone transmitter. At station 2, contact *a* of indicator 13TR is connected to the No. 2 tone transmitter over normal contact *a* of relay F2LP and front contact *b* of relay F2L. Since the indicator is picked up and its back contact open, the tone transmitter is not energized and no carrier current of this frequency is transmitted. Again, at station 3, since no circuits are provided over front contact *b* of relay F3L, the tone transmitter is also deenergized.

At the office, relay RLP is deenergized by the opening of back contact *a* of relay L but this repeater relay holds its front contacts closed during its release period. The closing of front contact *a* of relay L completes the circuit over normal contact *a* of relay LP for energizing relay 5 which picks up. The circuit for relay 5 is otherwise similar to that for relay 1 so that its operation during this period will be similar. The closing of front contact *b* of relay 5 completes the circuit for energizing relay NLP which picks up, completing, at its own front contact *a*, the stick circuit which includes also front contact *a* of relay L. The opening of back contact *b* of relay NLP deenergizes relay 5 which shortly releases. In addition, the pick up of relay NLP initiates the cascaded pick up action of its repeater relays NLPP and NLPPP. Meanwhile, during the pick up action of relay NLP, the closing of other front contacts of relay 5 connect indication relays such as 5TK and 13TK (not shown) to the —R terminal of the corresponding tone receivers. Under the conditions at the field locations, relay 5TK is energized at this time but relay 13TK is not energized since only carrier current of the No. 1 tone frequency is being transmitted. The release of relay 5 ends the fifth recording period of the cycle.

Relay RLP at the office and the relays FRLP at the various field stations now release. The opening of front contact *b* of relay RLP at the office deenergizes relay RLPP which holds its front contacts closed for its period of release time. At station 1, contact *a* of indicator 6TR is now connected to the No. 1 tone transmitter by the transfer of contact *b* of relay F1RLP from its front to its back position. Since contact *a* of indicator 6TR is open, the transmission of the No. 1 carrier current tone is cut off at this time. At station 2, contact *a* of indicator 13TR remains connected to the tone transmitter since there are no line repeater relays at this location. Since the indicator contact is open, the tone remains off. However, if tone transmission has been initiated previously, its continuation will not cause the recording of any improper indications at the office. At the office, with relay NLP picked up, the release of relay RLP to close its back contact *f* completes the circuit for relay 6 which, thus energized, picks up. Relay 6TK is now connected to the No. 1 tone receiver but it is not energized due to the absence of carrier current of that frequency at this time. In connection with No. 2 tone receiver, relay 13TK is disconnected when relay 5 releases and no relay 14TK is provided since no such indication exists in the field.

Relay RLPP eventually releases at the office, deenergizing relays 6 and RLPPP which both immediately release. Release of relay 6 ends the sixth recording period. The opening of front contact *a* of relay RLPPP deenergizes relay T by interrupting its stick circuit, the energizing circuit already being open. Relay T releases to again open the line circuit, interrupting the circuit at its front contacts a and b to terminate the third line period of the scanning cycle.

The deenergization of the line circuit deenergizes all line relays and the neutral relays immediately release. At the stations, relays FNLP are deenergized but as before hold their front contacts closed for a period. However, relays FRLP at the various locations are energized and pick up under these conditions. Although all line relays LP are also deenergized, their contacts remain closed in the normal position. At station 1, contact a of indicator 7TR is now connected to the No. 1 tone transmitter over front contact b of relay F1NLP, normal contact b of relay F1LP and back contact b of relay F1L. Since this indicator contact is open, no tone transmission is initiated from this station. At station 2, since there are no circuits over back contact b of relay F2L, the tone transmitter remains deactivated and no further transmission will occur from this station since each of the two indications has had a recording period at the office during this scanning cycle. At station 3, contact a of indicator 15TR is now connected to the No. 2 transmitter, the circuit being similar to that just traced at station 1. Since contact a of relay 15TR is closed, the No. 2 tone transmitter at station 3 is energized and carrier current of this frequency is transmitted.

At the office, relay NLP is again deenergized but holds for its timing period. With relay L released, relay NLP held up, and relay RLP also released, the circuit is complete for energizing relay 7 which immediately picks up. Thus relays 7TK and 15TK (the latter not shown) are connected to the corresponding tone receivers and, under existing conditions, relay 15TK is energized. The closing of front contact b of relay 7 completes the energizing circuit of relay RLP which picks up and immediately completes its stick circuit at its own front contact a, this circuit further including back contact a of relay L. The pick up of relay RLP again initiates the cascaded energization of relays RLPP and RLPPP. The opening of back contact i of relay RLP interrupts the energization of relay 7 which immediately releases to end the seventh recording period.

Relay NLP at the office and relays FNLP at the various stations now release. At station 1, this switches the control of the No. 1 tone transmitter from indicator 7TR to indicator 8TR by the transfer of contact b of relay F1NLP from its front to its back position. Since contact a of indicator 8TR is closed, the No. 1 tone transmitter is now activated and carrier current is transmitted to the office. At station 3, the corresponding transfer of control of the No. 2 tone transmitter is from indicator 15TR to indicator 16TR. This latter indicator is picked up so that its back contact a is open, thus deenergizing the No. 2 tone transmitter to halt the transmission of carrier current of that frequency. At the office, relay NLPP holds when deenergized by the release of relay NLP. The closing of back contact f of relay NLP then completes the circuit including front contact c of relay NLPP for energizing relay 8 which picks up. Relay 8TK, now connected over front contact a of relay 8 to terminal —R of the No. 1 tone receiver, which is presently active because of the reception of carrier current of that frequency from station 1, is thus energized and picks up. Relay 16TK, which is not shown, is connected to the —R terminal of the No. 2 tone receiver over another front contact of relay 8. Since this receiver is presently nonactivated, this indication relay is not energized.

When relay RLPPP picks up in the cascaded action of the back contact repeaters of line relay L, the closing of its front contact b completes the circuit, further including front contacts b of relays NLPPP and 8, for energizing the lower winding of relay PT. It is obvious that the flow of current through this lower winding of relay PT is in the direction opposite to the arrow so that the relay operates its contacts to their reverse position. Again the operation of this relay occurs during a period when relay T is deenergized and released with its front contacts a and b open to deenergize the line circuit. Thus the operation of contacts a and b of relay PT from their normal to the reverse position has no effect at this time upon the energized condition of the line circuit.

Relay NLPP now releases at the end of its timing period and opens its front contacts a and c to deenergize relays NLPPP and 8, respectively, each of which immediately release. The release of relay 8 ends the eighth recording period of the cycle. With front contact a of relay RLPPP already closed, the closing of back contact a of relay NLPPP completes the energizing circuit for relay T which immediately picks up. The closing of front contacts a and b of relay T causes reenergization of the line circuit, again with reverse polarity, that is, with line wire L2 positive, ending the fourth line period of the scanning cycle. It is to be remembered that relay PT, just prior to this time, operated its contacts to their reverse position. The polarity of the voltage now applied to the line circuit from battery LB is the same as that which was initially applied at the beginning of the scanning cycle. In other words, at this point in the operation we have returned in the description to the condition which was assumed at the beginning of the scanning cycle, that is, to the point at which relay T has just closed its front contacts a and b with relay PT reverse. Thus a complete scanning cycle has been described which included four line condition periods or eight indicating or recording periods, two for each of the line periods of the cycle. The cycle of operation continues in the same manner, with one cycle following another in succession as long as energy continues to be applied to the apparatus.

I shall now describe the operation of the transistorized form of my invention as shown in FIGS. 5A and 5B, discussing first the transmitting unit TU shown within the dot-dash rectangle at the top of FIG. 5A. The operation of the oscillator circuit which includes transistors 101 and 102 is well known and it is believed requires no detailed explanation. It is to be understood that other oscillator circuit arrangements may be used as desired. The output of this oscillator circuit must be a low frequency, sine wave alternating current, as shown, for example, in FIG. 6 where this output wave of the oscillator forms the outer envelope of the schematic diagram. This sine wave output is fed through transformer 25 into a balanced squaring network. The secondary windings of transformer 25 are wound with opposite polarities, as indicated by the dots shown adjacent the outer ends of these windings. Assuming the time instant in the sine wave when the ends of the secondary windings designated by the dots have the relative positive polarity, it will be understood that at this instant the inner or adjacent ends of these secondary windings will have the relative negative polarity. Since transistor 104 is of the n-p-n junction type, the presence of negative potential upon the base of this transistor causes it to assume a non-conducting condition. However, transistor 103, being of the p-n-p junction type, becomes conducting with negative potential applied to its base.

With transistor 103 in its conducting state, current flows from the positive (+) bus wire, extending from the positive terminal of battery LB throughout the transmitting unit TU, through the emitter-collector circuit path of transistor 103, the resistor divider network to which the base of transistor 105 is connected and thence to the center tap (C) bus wire extending from the center tap of battery LB. This flow of current causes an increase in the potential at the mid-point of this resistor divider network and thus an increase in the potential applied to the base of transistor 105 which, as shown, is of the n-p-n junction type. This causes the base of this latter transistor to assume a higher potential in the positive direction than its emitter so that this transistor becomes conducting. Current then flows from the (+) bus through the resistor divider to which the base of transistor 107 is connected and the collector-emitter circuit path of transistor 105 to bus wire (C). This flow of current causes a lowering of the potential of the mid-point of the resistor divider and thus of the base of transistor 107, which is of the p-n-p junction type. With the base of transistor 107 having lower potential than its emitter, this transistor becomes conducting. Current then flows from bus wire (+) through the emitter-collector path of transistor 107 and inductor 31 to terminal L1, that is, line wire L1, and thence through a resistor-inductor shunt, for example, the one comprised of resistor 33, inductor 32, and the resistor divider network within registry unit R—R, to line wire L2 and bus wire (C) of battery LB within the transmitting unit TU. This flow of current makes line wire, or terminal, L1 positive in relation to terminal L2 of the line circuit.

When the inner or adjacent ends of the secondary winding of transformer 25 have positive polarity, the top half of the squaring network functions in a similar manner. That is, transistors 104, 106, and 108 become conducting, in order, current flowing through each transistor in circuits similar to those traced for the lower half but connected between bus wire (C) and bus wire (—) of battery LB. Tracing the path of current flow through transistor 108, the circuit extends from bus wire (C) to terminal L2 of the line circuit, through one of the line shunts previously described to terminal L1, thence through inductor 31 and the collector-emitter path of transistor 108 to bus wire (—) of battery LB. This flow of current creates a positive potential on terminal L2 relative to terminal L1.

Referring now to FIG. 6 for an illustration of the actual output from transmitting unit TU into the line circuit, it is to be understood that when the lower half of the squaring network is functioning as described first above, a reverse bias applied to the various transistors 103, 105, and 107 functions to prevent the final transistor 107 from conducting until the output wave from the oscillator reaches a predetermined potential level. In other words, transistor 107 remains nonconducting while the sine wave potential is rising during the positive half cycle for the time period indicated by the shaded portion 11 of the chart in FIG. 6. When the sine wave potential reaches the predetermined level, transistor 107 becomes conducting. This same reverse bias cuts off transistor 107 so that it becomes nonconducting, and thus removes the energy from the output, when the potential of the sine wave of the oscillator falls to this same preselected point. That is, transistor 107 is nonconducting during the remaining portion 12 of the positive half of the sine wave cycle indicated in FIG. 6. In addition, the input signal to each transistor in the network is of sufficient magnitude to drive the transistor into a saturated conduction state when it finally becomes conducting. The level of the current flow, and obviously the potential of the line circuit, does not increase above the level existing at the instant transistor 107 becomes conducting. As indicated in FIG. 6, the wave form of the line circuit potential thus increases from zero to a predetermined level instantaneously and remains at that level until the reverse bias cuts off the transistors when the decreasing sine wave potential reaches the predetermined level.

The reverse bias potentials and the saturated conductive state function in a similar manner when the top half of the balanced squaring network is functioning during the opposite polarity of the sine wave. This is also indicated in a similar manner in FIG. 6, transistor 108 being biased to its nonconducting state during shaded periods 13 and 14. The actual output of transmitting unit TU to terminals L1 and L2 of the line circuit thus takes the form of a square wave with periods of no line energy separating the periods of opposite polarity of the output voltage. Thus, the wave form of the line circuit potential provided by transmitting unit TU is the same form as the line circuit potential shown schematically in FIG. 3 and in FIG. 4. It is obvious, therefore, that the code form transmitted into the line circuit by the transistorized transmitting unit is the same as the code form provided in the relay forms of my invention previously described.

The registry unit R—R (FIG. 5A) at the office follows this line circuit code to establish the four recording conditions in a manner similar to that used in the first form of the invention. The registry unit includes, first, a bi-stable multivibrator circuit arrangement comprising principally transistors 111 and 112. This arrangement is used to detect the polarity of the line circuit energy and to hold an indication of the last polarity during the following line circuit deenergized period. This bistable circuit is of the usual arrangement with the bases of the transistors cross connected to the collectors of the opposite transistor. Each collector is also connected to the negative potential bus TN since these transistors are both of the p-n-p junction type. The cross connection includes a half-wave diode to pass the positive potential occurring when one transistor becomes conducting to bias the other transistor to its nonconducting condition. Thus, as is usual in such arrangements, only one transistor can be conducting at any time, the other transistor of necessity assuming its nonconducting state. In the usual manner, the bases are provided with a positive bias upon which negative actuating pulses are periodically superimposed. The emitter of each of these transistors is connected directly to the positive potential bus TB.

During line coding operation, negative pulses are applied alternately to the bases of these transistors from the ends of the resistor divider network connected between inductor 32 and resistor 33 which are included in the actual line circuit connections. Specifically, when line terminal L1 is of a relative positive polarity, a negative potential appears at the common point between the resistor network and inductor 32 and is thus applied to the base of transistor 111. This transistor becomes conducting and, of necessity, transistor 112 is forced to assume its nonconducting condition. When line terminal L2 has a relative positive polarity, a negative potential appears at the common point between the resistor divider and resistor 33 and is thus applied to the base of transistor 112, causing this transistor to assume its conducting condition. Obviously, through the cross connections, the base of transistor 111 becomes positive and this other transistor assumes its non-conducting condition. Each transistor 111 and 112, having become conducting during the appropriate energized period of the line circuit, holds in that state during the immediately following deenergized period.

Each pair of p-n-p junction type transistors associated with each of transistors 111 and 112 of the bistable circuit provide a switching network which detects the energized and deenergized conditions of the line circuit during the period when its associated bistable circuit transistor is in its conducting condition. For example, when line wire L2 has the relative negative polarity and transistor 111 is conducting, the same negative potenital is applied to the base of transistor 113 so that it also assumes its conducting condition. Under this condition, current flows from bus wire TB through a resistor, the emitter-collector path of transistor 113, and a resistor network to bus wire TN. This flow of current holds the base of transistor 114 at a sufficiently positive potential to prevent this transistor from becoming conducting at this particular time. When the line circuit is deenergized, that is, terminal L2 becomes zero potential, the base of transistor 113 is provided with sufficient positive bias from bus wire TB to halt or interrupt its conducting condition. With the positive bias resulting from the flow of current through transistor 113 removed, and with transistor 111 in its conducting state, the base of transistor 114 assumes a negative potential relative to its own emitter and this transmitter become conducting. Current then flows from bus wire TB through the emitter-collector path of transistor 111, the similar path in transistor 114, and a resistor network to bus wire TN. It is to be noted that during the periods when transistor 111 is nonconducting, the base and emitter of transistor 114 have relatively the same potential so that this transistor remains non-conducting regardless of the condition of the line circuit.

When transistor 113 is conducting, as discussed above, the flow of current through its emitter-collector path also causes a charging current to flow through capacitor 17, this capacitor being connected in multiple with a portion of the resistor network between the collector of transistor 113 and bus wire TN. This charging current creates a positive pulse on the base of power transistor 117, of the n-p-n junction type, which is sufficient to cause it to become conducting. Current then flows from terminal TB through the winding of relay 1 and the collector-emitter path of transistor 117 to terminal TN. Relay 1 is thus energized and picks up. When capacitor 17 becomes charged, the positive potential disappears and transistor 117 becomes nonconducting. This occurs prior to the time that negative potential is removed from terminal L2 of the line circuit and thus prior also to the time when transistor 113 becomes nonconducting. Relay 1 is thus deenergized and releases prior to the end of this first line period, that is, the relative positive potential line period of the scanning cycle. This is similar to the operation shown for relay 1 in the corresponding horizontal line of FIG. 3.

When transistor 114 is conducting, during the following deenergized period of the line circuit, a similar charging pulse flows through capacitor 18 resulting from the flow of current through transistor 114. This creates a positive potential on the base of transistor 118, causing it to become conducting. Current then flows in the circuit traced from terminal TB through the winding of relay 2 and the collector-emitter path of transistor 118 to terminal TN. Relay 2 is thus energized and picks up. Again, the charging of capacitor 18 is completed prior to the end of the actual line period so that the positive potential disappears and transistor 118 resumes its nonconducting state, deenergizing relay 2 which releases prior to the end of this second line period. Again, this is similar to the operation shown for relay 2 in FIG. 3.

During the second half of a scanning cycle, when transistor 112 is conducting, the operation of transistors 115 and 116 during the energized and deenergized periods of the line circuit is similar to that just described for transistors 113 and 114, respectively. Charging pulses thus flow through capacitors 19 and 20 during the periods when transistors 115 and 116, respectively, are conducting. Each of these charging pulses causes the corresponding power transistors 119 and 120 to become conducting for a period so that relays 3 and 4 become energized while transistors 115 and 116, respectively, are in their conducting conditions. Said in another way, relays 3 and 4 are energized and pick up during the period that line wire L2 has the relative positive potential and during the following deenergized period, respectively.

Each of the field stations shown in FIG. 5B has a receiving unit RU similar in circuit arrangement to the receiving portion of registry unit R—R previously discussed. Since each receiving unit is identical in circuit detail only the circuit details for receiving unit RU1 at station 1 are shown to avoid repetition of identical portions. Each transistor in the station receiving unit is similar in purpose and operation to the transistor in registry unit R—R which has the same last numeral in its three digit reference character. Unit RU is connected across the line circuit in a manner similar to registry unit R—R at station 1, the connections including inductor 132 and resistor 133. The connections at the other stations have similar elements, for example, inductor 232 and resistor 233 at station 2 and conductor 332 and resistor 333 at station 3.

Describing briefly the operation of unit RU1 at station 1, it is obvious that when line wire L1 has a relative positive polarity, transistor 121 becomes conducting due to the negative potential applied to its base. This transistor holds its conducting state throughout the following deenergized period of the line circuit. During this first line energized period, at the time that transistor 121 becomes conducting, transistor 123 also becomes conducting but transistor 124 is held nonconducting. This is followed during the subsequent deenergized period by switching to the conducting condition in transistor 124 with transistor 123 becoming nonconducting. The operation of the other half of the circuit of the receiving unit is identical during the final two periods of the scanning cycle, starting with the period when line wire L2 has the positive polarity.

When transistor 123 is in its conducting state, current flows from terminal TB through the emitter-collector path of transistor 123 and a resistor-diode series network to terminal TP1 of the receiving unit, thence over back contact a of indicator relay 1TR, and terminals TP1A and TP of receiving unit RU1 to the No. 1 tone transmitter. The other power terminal of this tone transmitter is connected directly to terminal TN. It is to be noted that the positions of the indicator contacts at the various stations shown in FIG. 5B are the same, for comparison purposes, as those assumed in the first described form of my invention, as shown in FIG. 1B. Also the tone transmitters used at the three field stations in FIG. 5B are identical with the transmitters used in the other forms of my invention. Thus when terminal TB is connected to a transmitter, that transmitter is activated to transmit carrier current of the assigned frequency over the line circuit.

Since registry unit R—R and receiving unit RU1 are driven by the same code on the line circuit, transistors 113 and 123 shift to the conducting condition at approximately the same time. Thus, relay 1 picks up during the time that the No. 1 tone transmitter at station 1 is active due to indicator 1TR being in its released condition with its back contact a closed. Also at station 2 at this time, the No. 2 tone transmitter is active since indicator 5TR is released and its back contact a, connected between terminals TP1 and TP1A of receiving unit RU2, completes the circuit for supplying energy from terminal TB to the tone transmitter. Thus, in a manner previously described, the corresponding tone receivers at the registry location are activated due to the reception of carrier current of the proper frequency. Indication relays 1TK and 5TK are energized, their circuits being completed over front contacts a and b, respectively, of relay 1 and through internal circuits of the tone receivers between terminal —R of each receiver and its connection to terminal N. At station 3, obviously there are no circuits connected to receiving unit RU3 which are active during this first period of the scanning cycle.

During the following deenergized period of the line circuit, that is, the second period of the scanning cycle, when transistor 124 is in its conducting condition, the circuit for supplying energy to the No. 1 tone transmitter at station 1 is traced from terminal TB through the emitter-collector path of transistor 121, the corresponding path of transistor 124, front contact a of track repeater relay 2TP, and terminal TP of receiving unit RU1 to the No. 1 tone transmitter. The back contact repeater relay 2TP, which repeats the closing of back contacts of indicator relay 2TR, is used here to avoid any inductive pulses feeding into receiving unit RU1 which might cause a reversal in the condition of the bistable circuit network comprising transistors 121 and 122. During the first period of the scanning cycle, when energy appears on the line circuit, this energy will correct any erroneous reversal of the bistable network due to an extraneous pulse induced into the external connections over the contact of indicator 1TR and fed into the receiving unit circuits. However, during the second period when the line circuit is deenergized, no such line energy is available for correcting an erroneous reversal in the bistable network and thus it is imperative that such reversal be avoided by isolating the receiving unit from the effects of any pulses induced in the external connections over the contact of indicator 2TR. During the third and fourth periods of the scanning cycle, the external connections over contacts of the indicators are similar to those used, respectively, in periods 1 and 2 of the cycle. In other words, a back contact repeater relay 4TP is necessary to repeat the position of indicator relay 4TR during the fourth period in order to eliminate the effect of any pulses induced into the external connecting wires.

As was previously discussed, the No. 1 tone transmitter at station 1 is active during the second period of the scanning cycle. However, at station 2, the No. 2 tone transmitter is inactive since back contact a of indicator relay 6TR is open so that the corresponding relay 2TP within receiving unit RU2 is released to interrupt the circuit for supplying energy to this tone transmitter. At station 3, of course, there are no external connections to terminal TP2 of receiving unit RU3 and thus the tone transmitter is inactive. During this period, relay 2 at the office is picked up and, with the No. 1 tone receiver activated, relay 2TK is energized while relay 6TK remains released or becomes released.

At station 1, during the third period of the scanning cycle, energy is supplied to the No. 1 tone transmitter through transistor 125 and contact a of indicator relay 3TR, this contact being connected between terminals TP3 and TP3A of the receiving unit. Under the assumed conditions, the No. 1 tone transmitter is not activated since back contact a of relay 3TR is open. However, at station 3 back contact a of indicator 7TR, which is connected between terminals TP3 and TP3A of receiving unit RU3, is closed so that the No. 2 tone transmitter at this station is activated. There being no external connections to the corresponding receiving unit terminals at station 2, the tone transmitter there is not activated. Thus, during this third period, in a manner similar to that explained above, relay 7TK at the office is energized and picks up due to the active condition of the No. 2 tone receiver. During the fourth period, energy is supplied to the No. 1 tone transmitter through transistors 122 and 126 and front contact a of relay 4TP within receiving unit RU1. Since this circuit is obviously complete, due to back contact a of relay 4TR being closed, the No. 1 tone transmitter is activated to transmit carrier current of its assigned frequency. At station 3, with back contact a of relay 8TR open, relay 4TP within receiving unit RU3 is deenergized and its front contact a open to interrupt the circuit for supplying energy to the No. 2 tone transmitter which thus becomes deactivated. At the office then, relay 4TK is energized and picks up while relay 8TK remains deenergized.

This ends the scanning cycle of four periods identical with that described for the first form of my invention. During this scanning cycle, for each carrier tone provided, four indications were transmitted from the field stations to the office. Since transmitting unit TU at the office continues to operate, that is, since its oscillator operation is continuous, the next scanning cycle begins immediately so that scanning operation is repeated continuously in the same manner as in the other two forms. It is obvious that the operation of this transistorized form of the circuit arrangement of my invention is similar to that described for the first form and provides equivalent results.

Thus each of the forms of the system of my invention provides a remote indication system which continuously scans a plurality of field stations to actuate the transmission of indications, of the conditions or positions of field apparatus, from these stations to a remotely located central office. At this office location, these indications may be recorded in any manner desired to provide a record for the operator who, based on these indications, takes such actions as he deems necessary for the control of the entire installation. It is to be understood that this remote indication system may be associated with a remote control system whereby supervisory control is effected at the same or similar station locations for the operation of the installation. Indication systems embodying the various forms of my invention herein described provide economical means of transmitting such indications of this central office by carrier tone transmitters and receivers, that is, by carrier tone circuits. Each carrier tone is capable of transmitting the indications from a plurality of indicators at the field stations, it being unnecessary that the indicators assigned even to one particular tone be located at a single location. The system is thus economical in its use of carrier frequency assignments and in transmitting such frequencies as are used over a single line circuit which may also carry the transmitted controls for the scanning action at the various stations.

Although I have herein shown and described but three forms of remote indication systems embodying the circuits of my invention, it is to be understood that various changes and modifications may be made therein within the scope of the appended claims without departing from the spirit and scope of my invention.

Having thus described my invention, what I claim is:

1. A remote indication system, including a control location and at least one remote location connected by a communication channel capable of conducting signals of various charateristics, comprising, a transmitting means having connections to said channel for transmitting signals alternately of a first and a second characteristic, successive signals being spaced by similar periods of no signal, a first receiving means at said control location and a second receiving means at said remote location, each receiving means having connections to said channel at the corresponding location and responsive to the successive signals transmitted by said transmitting means for cyclically establishing in synchronism a plurality of successive conditions, a plurality of two-position indicators at said remote location one corresponding to each condition of the associated receiving means, a transmitter at said remote location having connections to said channel for transmitting when actuated a signal of a third characteristic, circuit means at said remote location controlled by said second receiving means and by said indicators and having connections for actuating said transmitter during each successive condition of said receiving means when the corresponding indicator occupies a preselected one of its positions, and a recording means at said control location having connections to said channel and controlled by said first receiving means and responsive to signals of said third characteristic for individually recording the positions of said indicators at the remote location in accordance with the signals received from said transmitter.

2. A remote indication system including an office location and a plurality of remote station locations connected by a communication channel capable of conducting signals of various characteristics, comprising, a transmitting means at said office having connections to said channel for continuously transmitting signals alternately of a first and a second characteristic, successive signals being spaced by similar periods of no signal, a first receiving means at said office having connections to said channel and responsive to the signals transmitted by said transmitting means for cyclically establishing in succession a plurality of distinct conditions, a separate receiving means at each station having connections to said channel and responsive to the signals transmitted by said transmitting means for cyclically establishing in succession a plurality of distinct conditions, each synchronized with the corresponding condition of said first receiving means, a plurality of two-position indicators at each of said stations, one corresponding to each condition of the associated receiving means, a transmitter at each station having connections to said channel for transmitting when actuated a signal having a distinct characteristic unique in said indication system, circuit means at each station controlled by the corresponding station receiving means and by the indicators at that station and having connections for actuating the associated station transmitter during each successive condition of the corresponding station receiving means when the indicator corresponding to the condition occupies a preselected one of its positions, and a recording means at said office for each of said stations, each recording means having connnections to said channel responsive to signals of the characteristic unique to the corresponding station transmitter and controlled by said first receiving means for individually recording the position of the indicators at the corresponding station in accordance with the signals received from that station transmitter.

3. In a remote indication system including an office location and a plurality of spaced station locations connected by a communication channel capable of conducting signals of various characteristics, the combination comprising, a transmitting means at said office having connections to said channel for continuously transmitting signals alternately of a first and a second characteristic, successive signals being spaced by similar periods of no signal, a registry unit at said office having connections to said channel and responsive to the signals transmitted by said transmitting means for cyclically establishing a succession of distinct conditions, a receiving means at each station having connections to said channel and responsive to the signals transmitted by said transmitting means for cyclically establishing a succession of distinct conditions, each receiving means condition being synchronized wth the corresponding condition of said regstry unit, at least one two-position indicator at each station, each indicator being assigned to a particular one of the conditions of the corresponding station receiving means, a transmitter at each station having connections to said channel for transmitting when actuated a signal having a characteristic at least distinct from the characteristics of the signals transmitted from said office, circuit means at each station controlled by the corresponding receiving means and by each indicator at that station for actuating the associated transmitter during preselected ones of the successive conditions of the corresponding station receiving means which are not preselected at other stations having transmitters with the same signal characteristic only when the indicator assigned to that condition occupies a preselected one of its positions, and a recording means at said office for each different signal characteristic of said station transmitters, each recording means having connections to said channel responsive to signals of the corresponding characteristic and controlled by said registry unit for individually recording the position of the indicators associated with station transmitters having the corresponding characteristic regardless of the station location.

4. A remote indication system including a control office and at least one remote station connected by a communication channel capable of conducting signals of various characteristics, comprising, a code forming means at said office having connections to said channel, a control means at said office having connections for energizing said code forming means to transmit over said channel a code comprising signals alternately of a first and a second characteristic, successive signals being spaced by similar periods of no signal, a receiving means at said station having connections to said channel for detecting the characteristic of each transmitted signal and the succeeding no signal period to establish cyclically a plurality of successive conditions, a plurality of two-position indicators at said station one corresponding to each condition of the station receiving means, a transmitter at said station having connections to said channel for transmitting when actuated a signal having a third characteristic, circuit means at said station controlled by said station receiving means and by said indicators and having connections for actuating said transmitter during each successive conditions of said station receiving means when the corresponding indicator occupies a preselected one of its positions, a registry means at said office having connections to said channel for detecting the characteristic of each transmitted code signal and the succeeding no signal period to establish a plurality of successive conditions in synchronism with the corresponding conditions of said station receiving means, and an indication recording means controlled by said office registry means during each condition and having connections to said channel for receiving the third characteristic signals to individually record the position of said indicators during each code cycle.

5. In a remote indication system including a communication channel capable of conducting signals having various characteristics, the combination comprising, a code transmitting unit having connections to said channel for continuously transmitting a code cycle comprising signals alternately having a first and a second characteristic spaced by periods of no signal, a receiving means having connections to said channel and responsive to the code transmitted by said transmitting means for cyclically establishing a plurality of successive conditions; a plurality of two-position indicators associated wtih said receiving means, one indicator corresponding to each condition of the associated receiving means; a transmitter associated with said receiving means and having connections to said channel for transmitting when energized a signal having a third characteristic, circuit means controlled by said receiving means and by said indicators and having connections for energizing said transmitter during each condition of the associated receiving means when the corresponding indicator occupies a preselected one of its positions, a registry means having connections to said channel and responsive to the code transmitted by said transmitting means for cyclically establishing a plurality of successive conditions, each in synchronism with the corresponding condition of said receiving means, and an indication recording means associated wtih said registry means having connections to said channel responsive to signals of said third characteristic and controlled by said registry means during each condition for recording the posititon of the indicator corresponding to that condition in accordance with the signal transmitted by said transmitter.

6. A remote indication system, including an office location and a plurality of remote station locations connected by a communication channel capable of conducting signals of various characteristics, comprising, a transmitting means having connections to said channel for continuously transmitting a code comprising pulses alternately of a first and a second characteristic spaced by other pulses of a third characteristic, a first receiving means at said office having connections to said channel and responsive to the transmitted code pulses for cyclically establishing a plurality of successive conditions, a separate receiving means at each station having connections to said channel and responsive to the transmitted code pulses for cyclically establishing a plurality of successive conditions, each synchronized wtih the corresponding condition of said first receiving means, a plurality of two-position indicators divided between the several stations, one indicator corresponding to each condition establshed by the several receiving means in synchronism, each indicator controlling a contact closed when the indicator occupies a preselected one of its positions, a transmitter at each station having connections to said channel for transmitting when actuated a signal having a common characteristic different from that of any code pulse, circuit means at each station controlled by the corresponding station receiving means and by the contacts of the indicators at that station and having connections for actuating the associated station transmitter during each condition of that station receiving means to which an associated idicator corresponds only when that indicator contact is closed, and a recording means at said office controlled by said first receiving means and having connections to said channel responsive only to signals of said common characteristic for individually recording the positions of all indicators at the several stations in accordance with the signals received from the several transmitters during each cycle of successive conditions of said first receiving means.

7. A remote indication system including a control location and at least one remote location connected by a communication channel capable of conducting between such locations signals of various characteristics, comprising, a transmitting means at said control location having connections to said channel for transmitting in continuous succession a four pulse code cycle, a first and a second receiving means at said control and said remote location respectively, each receiving means having connections to said channel at the corresponding location and responsive to the transmitted code pulses for establishing in successive cycles a plurality of successive circuit conditions each synchronized wtih the corresponding circuit condition of the other receiving means, a plurality of two-position indicators at said remote location one for each circuit condition of said second receiving means, each indicator controlling a contact closed when the associated indicator occupies a preselected one of its positions, a transmitter at said remote location having connections to said channel for transmitting when energized a signal having a characteristic different from that of any of said code pulses, circuit means at said remote location controlled by said second receiving means and successively by said indicator contacts and having connections for energizing said transmitter during each circuit condition when the corresponding indicator contact is closed, and a recording means at said control location controlled by said first receiving means and having connections to said channel for responding to signals from said transmitter to individually record the positions of said indicators during each code cycle.

8. In a remote indication system including a registry location and at least one remote station location connected by a communication channel capable of conducting signals of various characteristics, the combination comprising a transmitting means at said registry location having connections to said channel for transmitting signals alternately of a first and a second characteristic, successive signals being spaced by similar periods of no signal, a registry unit at said registry location having connections to said channel and responsive to the signals transmitted by said transmitting means for cyclically establishing four successive conditions, a receiving means at said station having connections to said channel and responsive to the signals transmitted by said transmitting means for cyclically establishing four successive conditions in synchronism with the corresponding four conditions of said registry unit, four two-position indicators at said station, one indicator corresponding to each of the four conditions of said station receiving means, a transmitter at said station having connections to said channel for transmitting when energized a signal of a third characteristic, circuit means at said station controlled by said receiving means and successively by each of said indicators and having connections for energizing said transmitter during each successive condition of said receiving means if the corresponding indicator occupies a preselected one of its two positions, and recording means at said registry location controlled by said registry unit and having connections to said channel for responding to signals of said third characteristic transmitted from said station during each simultaneous condition of said registry unit and said station receiving means to record the position of the indicator corresponding to the existing condition.

9. A remote indication system including a control location and at least one remote location connected by a communication channel capable of conducting signals of various characteristics, comprising, a transmitting means at said control location having connections to said channel for transmitting signals alternately of a first and a second characteristic, successive signals being spaced by similar periods of no signal, a first receiving means at said control location and a second receiving means at said remote location, each receiving means having connections to said channel at the corresponding location and responsive to the signals transmitted by said transmitting means for cyclically establishing in synchronism a plurality of successive conditions, said first receiving means having connections for controlling said transmitting means to advance the cycle of signal transmission only as said first receiving means establishes in order each of its successive conditions, a plurality of two-position indicators at said remote location one corresponding to each condition of the associated receiving means, each indicator controlling a contact closed when the associated indicator occupies a preselected one of its positions, a transmitter at said remote location having connections to said channel for transmitting when energized a signal of a third characteristic, circuit means at said remote location controlled by said second receiving means and by the contacts of said indicators and having connections for energizing said transmitter during each successive condition of said receiving means when the corresponding indicator contact is closed, and a recording means at said control location having connections to said channel and controlled by said first receiving means and responsive to signals of said third characteristic for individually recording the positions of said indicators at the remote location in accordance with the signals received from said transmitter.

10. A remote indication system, including an office location and a plurality of remote station locations connected by a communication channel capable of conducting signals of various characteristics, comprising, a transmitting means at said office having connections to said channel for transmitting signals alternately of a first and a second characteristic, successive signals being spaced by similar periods of no signal, a first receiving means at said office having connections to said channel and responsive to the signals transmitted by said transmitting means for cyclically establishing in succession a plurality of distinct conditions, a separate receiving means at each station having connections to said channel and responsive to the signals transmitted by said transmitting means for cyclically establishing in succession a plurality of distinct conditions, each synchronized with the corresponding condition of said first receiving means, said first receiving means having connections for controlling said transmitting means to advance the cycle of signal transmission only as said first receiving means establishes in order each of its successive conditions, a plurality of two-position indicators at each of said stations, one corresponding to each condition of the associated receiving means, a transmitter at each station having connections to said channel for transmitting when actuated a signal having a distinct characteristic unique in said indication system, circuit means at each station controlled by the corresponding station receiving means and by the indicators at that station and having connections for actuating the associated station transmitter during each successive condition of the corresponding station receiving means when the indicator contact corresponding to that condition occupies a preselected one of its positions, and a recording means at said office for each of said stations, each recording means having connections to said channel responsive to signals of the characteristic unique to the corresponding station transmitter and controlled by said first receiving means for individually recording the position of the indicators at the corresponding station in accordance with the signals received from that station transmitter.

11. In a remote indication system including an office location and a plurality of spaced station locations connected by a communication channel capable of conducting signals of various characteristics, the combination comprising, a transmitting means at said office having connections to said channel for continuously transmitting signals alternately of a first and a second characteristic, successive signals being spaced by similar periods of no signal, a registry unit at said office having connections to said channel and responsive to the signals transmitted by said transmitting means for cyclically establishing a succession of distinct conditions, said registry unit having connections for controlling said transmitting means to advance the cycle of signal transmission only as said registry unit establishes in proper order during a cycle each of its successive conditions, a receiving means at each station having connections to said channel and responsive to the signals transmitted by said transmitting means for cyclically establishing a succession of distinct conditions, each synchronized with the corresponding condition of said registry unit, at least one two-position indicator at each station, each indicator being assigned to a particular one of the conditions of the corresponding station receiving means, a transmitter at each station having connections to said channel for transmitting when actuated a signal having a characteristic at least distinct from the characteristics of the signals transmitted from said office, circuit means at each station controlled by the corresponding receiving means and by each indicator at that station for energizing the associated transmitter during preselected ones of the successive conditions of the corresponding station receiving means which are not preselected at other stations having transmitters with the same signal characteristic only when the indicator assigned to that preselected condition occupies a selected one of its positions, and a recording means at said office for each different signal characteristic of said station transmitters, each recording means having connections to said channel responsive to signals of the corresponding characteristic and controlled by said registry unit for individually recording the position of the indicators associated with station transmitters having the corresponding characteristic regardless of the station location.

12. In a remote indication system including a registry location and at least one remote station connected by a communication channel capable of conducting signals of various characteristics, the combination comprising, a transmitting means at said registry location having connections to said channel for transmitting signals alternately of a first and a second characteristic, successive signals being spaced by similar periods of no signal, a registry unit at said registry location having connections to said channel and responsive to the signals transmitted by said transmitting means for cyclically establishing four successive conditions, said registry unit having connections for controlling said transmitting means to advance the cycle of signal transmission only as said registry unit successively establishes each of its four conditions, a receiving means at said station having connections to said channel and responsive to the signals transmitted by said transmitting means for cyclically establishing four successive conditions in synchronism with the corresponding four conditions of said registry unit, a two-position indicator at said station for each condition of said receiving means, each indicator controlling a contact closed when that indicator occupies a preselected one of its positions, a transmitter at said station having connections to said channel for transmitting when energized a signal having a third characteristic, circut means at said station controlled by said receiving means and by the contacts of said indicators for energizing said transmitter during each successive condition of said receiving means if the corresponding indicator contact is closed, and a recording means at said registry location having connections to said channel and controlled by said registry unit and responsive to signals of said third characteristic for individually recording the positions of said station indicators in accordance with the signals received from said transmitter.

13. In a remote indication system including a registry location and at least one remote station location connected by a communication channel capable of conducting signals of various characteristics, the combination comprising, a pulse forming network having connections to said channel for transmitting signals alternately of a first and a second characteristic, successive signals being spaced by similar periods of no signal, a registry switching unit at said registry location having connections to said channel and responsive to the signals transmitted by said pulse forming network for cyclically establishing four successive circuit conditions, a pulse receiving switching means at said station having connections to said channel and responsive to the signals transmitted by said transmitting means for cyclically establishing four successive circuit conditions in synchronism with the corresponding four circuit conditions of said registry switching unit, four two-position indicators at said station, one indicator corresponding to each circuit condition of said pulse receiving switching means, a transmitter at said station having connections to said channel for transmitting when actuated a signal of a third characteristic, circuit means at said station controlled by said pulse receiving switching means and successively by each of said indicators and having connections for actuating said transmitter during each successive circuit condition of said pulse receiving switching means if the corresponding indicator occupies a preselected one of its two positions, and recording means at said registry location controlled by said registry switching unit and having connections to said channel for responding to signals of said third characteristic transmitted from said station during each simultaneous circuit condition of said registry switching unit and said pulse receiving switching means to record the existing position of the indicator corresponding to that circuit condition.

14. A remote indication system including a control office and at least one remote station connected by a communication channel capable of conducting signals of various characteristics, comprising, a pulse forming means having connections to said channel, an oscillator means having connections for periodically energizing said pulse forming means to transmit over said channel a code comprising pulses of energy alternately of a first and a second characteristic, successive pulses being spaced by similar periods of no energy, a pulse receiving means at said station having connections to said channel for detecting the characteristic of each transmitted code pulse and the succeeding deenergized period to establish cyclically a plurality of successive circuit conditions, a plurality of two-position indicators at said station one corresponding to each circuit condition of the pulse receiving means, a transmitter at said station having connections to said channel for transmitting when actuated a signal having a third characteristic, indicating means at said station controlled by said pulse receiving means and by said indicators and having connections for actuating said transmitter during each successive circuit condition of said pulse receiving means when the corresponding indicator occupies a preselected one of its positions, a registry switching unit at said office having connections to said channel for detecting the characteristic of each transmitted code pulse and the succeeding deenergized period to establish a plurality of successive circuit conditions in synchronism with the corresponding circuit conditions of said station receiving means, and an indication recording means controlled by said office registry switching unit during each circuit condition and having connections to said channel for receiving the third characteristic signals to individually record the position of said indicators during each code cycle.

15. In a continuously operating remote indication system having successive cycles of operation and including an office location, at least one remote station, and a communication channel capable of conducting signals having various characteristics between the office and station; the combination comprising, a code transmitting arrangement comprising an energy source and an oscillator and a switching network each including electronic elements, said code transmitting arrangement being continuously operating and having connections to said channel for providing a selected number of code pulses during each cycle of operation, each pulse being distinctive from the immediately preceding and succeeding pulses; a pulse receiving means at said office and at said station, each including electronic circuit elements and having connections to said channel and responsive to said code pulses for establishing a succession of distinct circuit conditions, one for each code pulse during a cycle of operation; a plurality of counting relays at said office one corresponding to each circuit condition established by the office receiving means and an energizing circuit network therefor controlled by the office receiving means for successively energizing said counting relays one during each circuit condition, a plurality of two-position indicators at said station one corresponding to each counting relay, a transmitter at said station having connections to said channel for transmitting when actuated a signal having a characteristic different from that of any code pulse, a control circuit network for said transmitter controlled by the station receiving means and by said indicators for actuating the transmitter during each circuit condition of said station receiving means when the corresponding indicator occupies a preselected one of its positions, and recording means at said office having connections to said channel responsive only to signals from the station transmitter and controlled by the counting relays to individually record the position of each indicator during each cycle of operation.

16. In a continuously operating remote indication system having successive cycles of operation and including a control office location and at least one remote station connected by a communication channel capable of conducting between the locations signals having various characteristics, the combination comprising, a plurality of transmitting relays repeatedly operable through a selected sequence to divide each cycle of operation into a preselected number of periods, a code supply circuit having connections to said channel and an energy source and controlled by contacts of said transmitting relays for supplying a code pulse to said channel during each period of the operating cycle, each pulse being distinctive from the immediately preceding and succeeding pulses, a receiving relay means at said office and at said station each having connections to said channel and responsive to the sequence of code pulses during each cycle for establishing a distinctive local circuit condition during each period of the cycle, a plurality of counting relays at said office one for each period of said cycle, an energizing circuit network for said counting relays including selected ones of the local circuits established successively by the office receiving relay means for successively energizing said counting relays one during each period of a cycle, a control circuit network for said transmitting relays including other local circuits established successively by said office receiving relay means and contacts of said counting relays for energizing said transmitting relays in proper sequence to advance each cycle of operation only when the office local circuit conditions are established in proper sequence, a plurality of two-position indicators at said station one corresponding to each period of the operating cycle and each having a contact closed when that indicator occupies a preselected one of its positions, a transmitter at said station having connections to said channel for transmitting when energized a signal having a characteristic different from that of any code pulse, an energizing circuit network for said transmitter controlled successively by the local circuits established by said station receiving relay means and by the indicator contacts for energizing the transmitter during each period of the operating cycle when the corresponding indicator contact is closed, and recording means at said office having connections to said channel responsive to said transmitter signals and controlled by said counting relays to individually record the position of said indicators during each cycle of operation.

17. In a continuously operating remote indication system having successive cycles of operation and including a control office location and at least one remote station connected by a communication channel capable of conducting between the locations signals having various characteristics, the combination comprising, a plurality of transmitting relays operable through a selected sequence to divide each cycle of operation into a preselected number of periods, a code supply circuit having connections to said channel and an energy source and controlled by contacts of said transmitting relays for supplying a code pulse to said channel during each period of the operating cycle, each pulse being distinctive from the immediately preceding and succeeding pulses, a receiving relay means at said office and at said station each having connections to said channel and responsive to the sequence of code pulses during each cycle for establishing in succession two distinctive local circuit conditions during each successive period of the cycle, a plurality of counting relays at said office two for each period of said cycle, an energizing circuit network for said counting relays including selected ones of the local circuits established successively by the office receiving relay means for successively energizing said counting relays in succession one during each circuit condition in a cycle, a control circuit network for said transmitting relays including other local circuits established by said office receiving relay means and contacts of said counting relays for energizing said transmitting relays in proper sequence to advance each cycle of operation only when the office local circuit conditions are established in proper sequence, a plurality of two-position indicators at said station one corresponding to each circuit condition of the station receiving means and each having a contact closed when that indicator occupies a preselected one of its positions, a transmitter at said station having connections to said channel for transmitting when energized a signal having a characteristic different from that of any code pulse, an energizing circuit network for said transmitter controlled successively by the local circuits established by said station receiving relay means and by the indicator contacts for energizing the transmitter during each circuit condition of the station receiving means when the corresponding indicator contact is closed, and recording means at said office having connections to said channel responsive to said transmitter signals and controlled by said counting relays to individually record the position of said indicators during each cycle of operation.

18. In a remote indication system including a control office location and at least one remote station location connected by a communication channel capable of conducting between such locations signals of various characteristics, the combination comprising, a plurality of transmitting relays at said control office location operable in a preselected sequence, a code supply circuit connected to said channel and including a direct current source and contacts of said transmitting relays for continuously transmitting over said channel direct current pulses of alternately opposite polarity spaced by pulses of no current, a pair of office receiving relays connected to said channel and operable in repeated cycles through a sequence of four combinations of positions in response to the successive pulses transmitted over said channel, a pair of station receiving relays connected to said channel and operable in repeated cycles through a sequence of four combinations of positions in synchronism with the corresponding position combinations of said office relays in response to the successive pulses transmitted over said channel, repeater relays at said office controlled by contacts of said office receiving relays to distinguish the periods of direct current pulses and no-current pulses, counting relays at said office and control circuits therefor including contacts of said office receiving relays and said repeater relays to successively energize said counting relay to count each sequence of positions of said office receiving relays; control circuits for said transmitting relays including contacts of said office receiving relays, said repeater relays, and said counting relays to operate said transmitting relays through said preselected sequence to advance the cycle of pulse transmission, a two-position indicator at said station for each counting relay at said office, each indicator controlling a contact closed only when that indicator occupies a preselected one of its positions, a transmitter at said station having connections to said channel for transmitting when energized a carrier current of selected frequency, an energizing circuit network for said transmitter including contacts of said station receiving relays and said indicator contacts to energize said transmitter during each position combination of said station receiving relays when the corresponding indicator contact is closed, a carrier current receiver at said office connected to said channel and actuated in response to carrier current of said selected frequency to complete a circuit path, a registry relay at said office for each indicator; and an energizing circuit for each registry relay including an energy source, a front contact of the corresponding counting relay, and the circuit path of said carrier current receiver to control that registry relay to register the position occupied by the corresponding indicator.

References Cited in the file of this patent

UNITED STATES PATENTS

| | | |
|---|---|---|
| 2,039,405 | Green et al. | May 5, 1936 |
| 2,581,056 | Walmsley et al. | Jan. 1, 1952 |
| 2,715,218 | Curry | Aug. 9, 1955 |
| 2,874,368 | Sibley | Feb. 17, 1959 |
| 2,907,980 | Preston | Oct. 6, 1959 |
| 2,939,111 | Staples | May 31, 1960 |